US010613674B2

(12) United States Patent
Bathiche

(10) Patent No.: US 10,613,674 B2
(45) Date of Patent: *Apr. 7, 2020

(54) TOUCH-SENSITIVE BEZEL TECHNIQUES

(71) Applicant: Microsoft Technology Licensing, LLC, Redmond, WA (US)

(72) Inventor: Steven Nabil Bathiche, Kirkland, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/413,705

(22) Filed: Jan. 24, 2017

(65) Prior Publication Data

US 2017/0131835 A1 May 11, 2017

Related U.S. Application Data

(63) Continuation of application No. 13/674,357, filed on Nov. 12, 2012, now Pat. No. 9,582,122.

(51) Int. Cl.
*G06F 3/041* (2006.01)
*G06F 3/044* (2006.01)
*G06F 3/0488* (2013.01)

(52) U.S. Cl.
CPC ............ *G06F 3/0416* (2013.01); *G06F 3/041* (2013.01); *G06F 3/044* (2013.01); *G06F 3/0412* (2013.01);
(Continued)

(58) Field of Classification Search
CPC .. G06F 3/0416; G06F 3/04883; G06F 3/0412; G06F 3/044; G06F 3/045; G06F 3/041
See application file for complete search history.

(56) References Cited

U.S. PATENT DOCUMENTS 4,686,332 A 8/1987 Greanias et al.
4,843,538 A 6/1989 Lane et al.
(Continued)

FOREIGN PATENT DOCUMENTS

CN 1326564 12/2001
CN 1578430 2/2005
(Continued)

OTHER PUBLICATIONS

"Advisory Action", U.S. Appl. No. 12/695,842, dated Mar. 28, 2016, 3 pages.
(Continued)

*Primary Examiner* — Adam R. Giesy
(74) *Attorney, Agent, or Firm* — NovoTechIP International PLLC

(57) ABSTRACT

Touch-sensitive bezel techniques are described. In one or more implementations, a computing device includes touch sensors in a display portion of a display device and in a display capable bezel portion of the display device. The touch sensors can detect a touch input, and based on one or more characteristics of the touch input, a likelihood that a user intends or does not intend to interact with the computing device can be determined. A location of a centroid of the touch input is one such characteristic that can be utilized. In at least some implementations, the display capable bezel portion has display capabilities such that when a touch input is detected, the display capabilities in a region of the bezel portion can be activated, such as to display a menu in the region of the bezel portion of the display device.

19 Claims, 9 Drawing Sheets

(52) U.S. Cl.
CPC ........ *G06F 3/0488* (2013.01); *G06F 3/04883* (2013.01)

(56) References Cited

U.S. PATENT DOCUMENTS

| | | |
|---|---|---|
| 4,868,912 A | 9/1989 | Doering |
| 5,231,578 A | 7/1993 | Levin et al. |
| 5,237,647 A | 8/1993 | Roberts et al. |
| 5,252,951 A | 10/1993 | Tannenbaum et al. |
| 5,351,995 A | 10/1994 | Booker et al. |
| 5,404,458 A | 4/1995 | Zetts |
| 5,463,725 A | 10/1995 | Henckel et al. |
| 5,491,783 A | 2/1996 | Douglas et al. |
| 5,496,974 A | 3/1996 | Akebi et al. |
| 5,497,776 A | 3/1996 | Yamazaki et al. |
| 5,511,148 A | 4/1996 | Wellner |
| 5,555,369 A | 9/1996 | Menendez et al. |
| 5,596,697 A | 1/1997 | Foster et al. |
| 5,661,773 A | 8/1997 | Swerdloff et al. |
| 5,664,128 A | 9/1997 | Bauer |
| 5,664,133 A | 9/1997 | Malamud et al. |
| 5,694,150 A | 12/1997 | Sigona et al. |
| 5,731,813 A | 3/1998 | O'Rourke et al. |
| 5,761,485 A | 6/1998 | Munyan |
| 5,777,596 A | 7/1998 | Herbert |
| 5,817,019 A | 10/1998 | Kawashima |
| 5,821,930 A | 10/1998 | Hansen |
| 5,838,889 A | 11/1998 | Booker et al. |
| 5,898,434 A | 4/1999 | Small et al. |
| 5,943,052 A | 8/1999 | Allen |
| 5,969,720 A | 10/1999 | Lisle et al. |
| 6,029,214 A | 2/2000 | Dorfman et al. |
| 6,037,937 A | 3/2000 | Beaton et al. |
| 6,061,061 A | 5/2000 | Conrad et al. |
| 6,072,476 A | 6/2000 | Harada et al. |
| 6,097,392 A | 8/2000 | Leyerle |
| 6,115,724 A | 9/2000 | Booker et al. |
| 6,167,439 A | 12/2000 | Levine et al. |
| 6,208,331 B1 | 3/2001 | Singh |
| 6,239,798 B1 | 5/2001 | Ludolph et al. |
| 6,246,395 B1 | 6/2001 | Goyins |
| 6,266,050 B1 | 7/2001 | Oh et al. |
| 6,278,443 B1 | 8/2001 | Amro et al. |
| 6,310,610 B1 | 10/2001 | Beaton et al. |
| 6,340,979 B1 | 1/2002 | Beaton et al. |
| 6,396,523 B1 | 5/2002 | Segal et al. |
| 6,459,424 B1 | 10/2002 | Resman |
| 6,507,352 B1 | 1/2003 | Cohen et al. |
| 6,525,749 B1 | 2/2003 | Moran et al. |
| 6,545,669 B1 | 4/2003 | Kinawi et al. |
| 6,831,631 B2 | 12/2004 | Chuang |
| 6,859,909 B1 | 2/2005 | Lerner et al. |
| 6,920,619 B1 | 7/2005 | Milekic |
| 6,957,233 B1 | 10/2005 | Beezer et al. |
| 7,023,427 B2 | 4/2006 | Kraus et al. |
| 7,053,887 B2 | 5/2006 | Kraus et al. |
| 7,209,125 B2 | 4/2007 | Kong et al. |
| 7,295,191 B2 | 11/2007 | Kraus et al. |
| 7,302,650 B1 | 11/2007 | Allyn et al. |
| 7,338,224 B2 | 3/2008 | Jones et al. |
| 7,339,580 B2 | 3/2008 | Westerman et al. |
| 7,454,717 B2 | 11/2008 | Hinckley et al. |
| 7,479,949 B2 | 1/2009 | Jobs et al. |
| 7,506,269 B2 | 3/2009 | Lang |
| 7,532,196 B2 | 5/2009 | Hinckley |
| 7,561,146 B1 | 7/2009 | Hotelling |
| 7,605,804 B2 | 10/2009 | Wilson |
| 7,636,071 B2 | 12/2009 | O'Gorman |
| 7,643,012 B2 | 1/2010 | Kim et al. |
| 7,656,393 B2 | 2/2010 | King et al. |
| 7,676,767 B2 | 3/2010 | Hofmeister et al. |
| 7,760,187 B2 | 7/2010 | Kennedy |
| 7,821,780 B2 | 10/2010 | Choy |
| 7,847,789 B2 | 12/2010 | Kolmykov-Zotov et al. |
| D631,043 S | 1/2011 | Kell |
| 7,898,529 B2 | 3/2011 | Fitzmaurice et al. |
| 7,956,847 B2 | 6/2011 | Christie |
| 8,018,440 B2 | 9/2011 | Townsend et al. |
| 8,102,858 B1 | 1/2012 | Rahim et al. |
| 8,122,384 B2 | 2/2012 | Partridge et al. |
| 8,169,418 B2 | 5/2012 | Birkler |
| 8,181,122 B2 | 5/2012 | Davidson |
| 8,212,788 B2 | 7/2012 | Lam |
| 8,239,785 B2 | 8/2012 | Hinckley |
| 8,261,213 B2 | 9/2012 | Hinckley |
| 8,274,482 B2 | 9/2012 | Kim et al. |
| 8,284,170 B2 | 10/2012 | Bernstein |
| 8,289,289 B2 | 10/2012 | Rimon et al. |
| 8,294,669 B2 | 10/2012 | Partridge et al. |
| 8,294,686 B2 | 10/2012 | Townsend et al. |
| 8,327,295 B2 | 12/2012 | Ikeda et al. |
| 8,335,996 B2 | 12/2012 | Davidson et al. |
| 8,345,008 B2 | 1/2013 | Lee et al. |
| 8,373,660 B2 | 2/2013 | Pallakoff |
| 8,395,600 B2 | 3/2013 | Kawashima et al. |
| 8,407,606 B1 | 3/2013 | Davidson et al. |
| 8,473,870 B2 | 6/2013 | Hinckley et al. |
| 8,477,114 B2 | 7/2013 | Miller et al. |
| 8,539,384 B2 | 9/2013 | Hinckley et al. |
| 8,581,864 B2 | 11/2013 | Miyazawa et al. |
| 8,587,526 B2 | 11/2013 | Engelhardt et al. |
| 8,640,047 B2 | 1/2014 | Mouton et al. |
| 8,643,628 B1 | 2/2014 | Eriksson et al. |
| 8,659,570 B2 | 2/2014 | Townsend et al. |
| 8,707,174 B2 | 4/2014 | Hinckley et al. |
| 8,751,970 B2 | 6/2014 | Hinckley et al. |
| 8,788,967 B2 | 7/2014 | Davidson et al. |
| 8,799,827 B2 | 8/2014 | Hinckley et al. |
| 8,810,533 B2 | 8/2014 | Chen |
| 8,836,648 B2 | 9/2014 | Wilairat |
| 8,836,659 B2 | 9/2014 | Chen et al. |
| 9,047,009 B2 | 6/2015 | King |
| 9,075,522 B2 | 7/2015 | Hinckley et al. |
| 9,256,342 B2 | 2/2016 | Davidson |
| 9,261,964 B2 | 2/2016 | Townsend et al. |
| 9,274,682 B2 | 3/2016 | Hinckley et al. |
| 9,310,994 B2 | 4/2016 | Hinckley et al. |
| 9,360,972 B1 | 6/2016 | Avery et al. |
| 9,367,205 B2 | 6/2016 | Hinckley et al. |
| 9,477,337 B2 | 10/2016 | Cady et al. |
| 9,519,419 B2 | 12/2016 | Hinckley et al. |
| 9,582,122 B2 | 2/2017 | Bathiche |
| 9,594,457 B2 | 3/2017 | Townsend et al. |
| 9,720,586 B2 | 8/2017 | Dearman |
| 10,019,080 B2 | 7/2018 | Townsend |
| 2001/0012000 A1 | 8/2001 | Eberhard |
| 2001/0035860 A1 | 11/2001 | Segal et al. |
| 2001/0047263 A1 | 11/2001 | Smith et al. |
| 2002/0060701 A1 | 5/2002 | Naughton et al. |
| 2002/0097229 A1 | 7/2002 | Rose et al. |
| 2002/0101457 A1 | 8/2002 | Lang |
| 2002/0116421 A1 | 8/2002 | Fox et al. |
| 2003/0016253 A1 | 1/2003 | Aoki et al. |
| 2003/0063073 A1 | 4/2003 | Geaghan et al. |
| 2003/0067451 A1 | 4/2003 | Tagg et al. |
| 2003/0080946 A1 | 5/2003 | Chuang |
| 2003/0095095 A1 | 5/2003 | Pihlaja |
| 2003/0098858 A1 | 5/2003 | Perski et al. |
| 2003/0142081 A1 | 7/2003 | Iizuka |
| 2003/0179541 A1 | 9/2003 | Sullivan |
| 2003/0231219 A1 | 12/2003 | Leung |
| 2004/0001048 A1 | 1/2004 | Kraus et al. |
| 2004/0012572 A1 | 1/2004 | Sowden et al. |
| 2004/0155871 A1 | 8/2004 | Perski et al. |
| 2004/0236741 A1 | 11/2004 | Burstrom et al. |
| 2004/0236774 A1 | 11/2004 | Baird et al. |
| 2004/0255254 A1 | 12/2004 | Weingart et al. |
| 2005/0012723 A1 | 1/2005 | Pallakoff |
| 2005/0017957 A1 | 1/2005 | Yi |
| 2005/0017959 A1 | 1/2005 | Kraus et al. |
| 2005/0052432 A1 | 3/2005 | Kraus et al. |
| 2005/0076300 A1 | 4/2005 | Martinez |
| 2005/0101864 A1 | 5/2005 | Zheng et al. |
| 2005/0129314 A1 | 6/2005 | Chen |

(56) References Cited

U.S. PATENT DOCUMENTS

| | | |
|---|---|---|
| 2005/0162402 A1 | 7/2005 | Watanachote |
| 2005/0177796 A1 | 8/2005 | Takahashi |
| 2005/0184973 A1 | 8/2005 | Lum et al. |
| 2005/0189154 A1 | 9/2005 | Perski et al. |
| 2005/0198592 A1 | 9/2005 | Keely, Jr. et al. |
| 2006/0001650 A1 | 1/2006 | Robbins et al. |
| 2006/0010371 A1 | 1/2006 | Shur et al. |
| 2006/0012580 A1 | 1/2006 | Perski et al. |
| 2006/0012581 A1 | 1/2006 | Haim et al. |
| 2006/0022955 A1 | 2/2006 | Kennedy |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0031786 A1 | 2/2006 | Hillis et al. |
| 2006/0071912 A1 | 4/2006 | Hill |
| 2006/0092177 A1 | 5/2006 | Blasko |
| 2006/0093219 A1 | 5/2006 | Gounares et al. |
| 2006/0101354 A1 | 5/2006 | Hashimoto et al. |
| 2006/0109252 A1 | 5/2006 | Kolmykov-Zotov et al. |
| 2006/0112335 A1 | 5/2006 | Hofmeister et al. |
| 2006/0161870 A1 | 7/2006 | Hotelling et al. |
| 2006/0197750 A1 | 9/2006 | Kerr et al. |
| 2006/0197753 A1 | 9/2006 | Hotelling |
| 2006/0197963 A1 | 9/2006 | Royal et al. |
| 2006/0238517 A1 | 10/2006 | King et al. |
| 2006/0238520 A1 | 10/2006 | Westerman et al. |
| 2006/0262105 A1 | 11/2006 | Smith et al. |
| 2006/0262188 A1 | 11/2006 | Elyada et al. |
| 2006/0267955 A1 | 11/2006 | Hino |
| 2006/0279548 A1 | 12/2006 | Geaghan |
| 2006/0284852 A1 | 12/2006 | Hofmeister et al. |
| 2007/0043744 A1 | 2/2007 | Carro |
| 2007/0063987 A1 | 3/2007 | Sato et al. |
| 2007/0075976 A1 | 4/2007 | Kun et al. |
| 2007/0097096 A1 | 5/2007 | Rosenberg |
| 2007/0106939 A1 | 5/2007 | Qassoudi |
| 2007/0109274 A1 | 5/2007 | Reynolds |
| 2007/0120762 A1 | 5/2007 | O'Gorman |
| 2007/0146337 A1 | 6/2007 | Ording et al. |
| 2007/0146347 A1 | 6/2007 | Rosenberg |
| 2007/0150496 A1 | 6/2007 | Feinsmith |
| 2007/0152976 A1 | 7/2007 | Townsend et al. |
| 2007/0168890 A1 | 7/2007 | Zhao et al. |
| 2007/0171211 A1 | 7/2007 | Perski et al. |
| 2007/0236468 A1 | 10/2007 | Tuli |
| 2007/0242056 A1 | 10/2007 | Engelhardt et al. |
| 2007/0262951 A1 | 11/2007 | Huie et al. |
| 2008/0001924 A1 | 1/2008 | de los Reyes et al. |
| 2008/0005703 A1 | 1/2008 | Radivojevic et al. |
| 2008/0036743 A1 | 2/2008 | Westerman et al. |
| 2008/0040692 A1 | 2/2008 | Sunday et al. |
| 2008/0042978 A1 | 2/2008 | Perez-Noguera |
| 2008/0046425 A1 | 2/2008 | Perski |
| 2008/0052945 A1 | 3/2008 | Matas et al. |
| 2008/0059914 A1 | 3/2008 | Allyn et al. |
| 2008/0062141 A1 | 3/2008 | Chandhri |
| 2008/0065720 A1 | 3/2008 | Brodersen et al. |
| 2008/0074402 A1 | 3/2008 | Cornish et al. |
| 2008/0082903 A1 | 4/2008 | McCurdy et al. |
| 2008/0084400 A1 | 4/2008 | Rosenberg |
| 2008/0164982 A1 | 7/2008 | Andrews et al. |
| 2008/0165141 A1 | 7/2008 | Christie |
| 2008/0165255 A1 | 7/2008 | Christie et al. |
| 2008/0168382 A1 | 7/2008 | Louch et al. |
| 2008/0168396 A1 | 7/2008 | Matas et al. |
| 2008/0168403 A1 | 7/2008 | Westerman et al. |
| 2008/0180404 A1 | 7/2008 | Han et al. |
| 2008/0211766 A1 | 9/2008 | Westerman et al. |
| 2008/0211778 A1 | 9/2008 | Ording et al. |
| 2008/0218494 A1 | 9/2008 | Perski et al. |
| 2008/0229192 A1 | 9/2008 | Gear et al. |
| 2008/0249682 A1 | 10/2008 | Wisniewski et al. |
| 2008/0278455 A1 | 11/2008 | Atkins et al. |
| 2008/0303798 A1 | 12/2008 | Matsudate et al. |
| 2009/0019188 A1 | 1/2009 | Mattice et al. |
| 2009/0033632 A1 | 2/2009 | Szolyga et al. |
| 2009/0054107 A1 | 2/2009 | Feland, III et al. |
| 2009/0058830 A1 | 3/2009 | Herz |
| 2009/0059730 A1 | 3/2009 | Lyons et al. |
| 2009/0064012 A1 | 3/2009 | Tremblay |
| 2009/0074255 A1 | 3/2009 | Holm |
| 2009/0077501 A1 | 3/2009 | Partridge et al. |
| 2009/0079699 A1 | 3/2009 | Sun |
| 2009/0094562 A1 | 4/2009 | Jeong et al. |
| 2009/0096758 A1 | 4/2009 | Hotelling et al. |
| 2009/0117943 A1 | 5/2009 | Lee et al. |
| 2009/0128505 A1 | 5/2009 | Partridge et al. |
| 2009/0138830 A1 | 5/2009 | Borgaonkar et al. |
| 2009/0143141 A1 | 6/2009 | Wells et al. |
| 2009/0153289 A1 | 6/2009 | Hope et al. |
| 2009/0153438 A1 | 6/2009 | Miller et al. |
| 2009/0167696 A1 | 7/2009 | Griffin |
| 2009/0167702 A1 | 7/2009 | Nurmi |
| 2009/0174679 A1 | 7/2009 | Westerman |
| 2009/0184921 A1 | 7/2009 | Scott et al. |
| 2009/0193366 A1 | 7/2009 | Davidson |
| 2009/0217211 A1 | 8/2009 | Hildreth et al. |
| 2009/0249236 A1 | 10/2009 | Westerman et al. |
| 2009/0249247 A1 | 10/2009 | Tseng et al. |
| 2009/0251432 A1 | 10/2009 | Wang et al. |
| 2009/0251434 A1 | 10/2009 | Rimon et al. |
| 2009/0256857 A1 | 10/2009 | Davidson et al. |
| 2009/0276701 A1 | 11/2009 | Nurmi |
| 2009/0278806 A1 | 11/2009 | Duarte et al. |
| 2009/0282332 A1 | 11/2009 | Porat |
| 2009/0284478 A1 | 11/2009 | De la Torre Baltierra et al. |
| 2009/0284488 A1 | 11/2009 | Sip |
| 2009/0295753 A1 | 12/2009 | King et al. |
| 2009/0307589 A1 | 12/2009 | Inose et al. |
| 2009/0309846 A1 | 12/2009 | Trachtenberg et al. |
| 2009/0320070 A1 | 12/2009 | Inoguchi |
| 2009/0327963 A1 | 12/2009 | Mouilleseaux et al. |
| 2009/0327975 A1 | 12/2009 | Stedman |
| 2010/0013768 A1 | 1/2010 | Leung |
| 2010/0013792 A1 | 1/2010 | Fukushima |
| 2010/0016049 A1 | 1/2010 | Shirakawa et al. |
| 2010/0020025 A1 | 1/2010 | Lemort et al. |
| 2010/0039392 A1 | 2/2010 | Pratt et al. |
| 2010/0042827 A1 | 2/2010 | Pratt et al. |
| 2010/0045705 A1 | 2/2010 | Vertegaal et al. |
| 2010/0050076 A1 | 2/2010 | Roth |
| 2010/0051355 A1 | 3/2010 | Yang |
| 2010/0053103 A1 | 3/2010 | No et al. |
| 2010/0053861 A1 | 3/2010 | Kim et al. |
| 2010/0058182 A1 | 3/2010 | Jung |
| 2010/0060607 A1 | 3/2010 | Ludwig |
| 2010/0066667 A1 | 3/2010 | MacDougall et al. |
| 2010/0066694 A1 | 3/2010 | Jonsdottir |
| 2010/0066698 A1 | 3/2010 | Seo |
| 2010/0079392 A1 | 4/2010 | Chiang et al. |
| 2010/0081475 A1 | 4/2010 | Chiang et al. |
| 2010/0083154 A1 | 4/2010 | Takeshita |
| 2010/0083190 A1 | 4/2010 | Roberts et al. |
| 2010/0088641 A1 | 4/2010 | Choi |
| 2010/0090971 A1 | 4/2010 | Choi et al. |
| 2010/0097338 A1 | 4/2010 | Miyashita et al. |
| 2010/0103136 A1 | 4/2010 | Ono et al. |
| 2010/0105443 A1 | 4/2010 | Vaisanen |
| 2010/0107067 A1 | 4/2010 | Vaisanen |
| 2010/0110019 A1 | 5/2010 | Ozias et al. |
| 2010/0115455 A1 | 5/2010 | Kim |
| 2010/0123675 A1 | 5/2010 | Ippel |
| 2010/0134415 A1 | 6/2010 | Iwase et al. |
| 2010/0134423 A1 | 6/2010 | Brisebois et al. |
| 2010/0134424 A1 | 6/2010 | Brisebois et al. |
| 2010/0137027 A1 | 6/2010 | Kim |
| 2010/0149109 A1 | 6/2010 | Elias |
| 2010/0164878 A1 | 7/2010 | Bestle et al. |
| 2010/0164897 A1 | 7/2010 | Morin et al. |
| 2010/0164959 A1 | 7/2010 | Brown et al. |
| 2010/0169813 A1 | 7/2010 | Chang |
| 2010/0182247 A1 | 7/2010 | Petschnigg et al. |
| 2010/0182264 A1 | 7/2010 | Hahn et al. |
| 2010/0188371 A1 | 7/2010 | Lowles et al. |

(56) References Cited

U.S. PATENT DOCUMENTS

| | | |
|---|---|---|
| 2010/0201634 A1 | 8/2010 | Coddington |
| 2010/0213040 A1 | 8/2010 | Yeh et al. |
| 2010/0217428 A1 | 8/2010 | Strong et al. |
| 2010/0220900 A1 | 9/2010 | Orsley |
| 2010/0241973 A1 | 9/2010 | Whiddett |
| 2010/0245242 A1 | 9/2010 | Wu et al. |
| 2010/0245263 A1 | 9/2010 | Parada, Jr. et al. |
| 2010/0251112 A1 | 9/2010 | Hinckley et al. |
| 2010/0251189 A1 | 9/2010 | Jaeger |
| 2010/0262928 A1 | 10/2010 | Abbott |
| 2010/0283748 A1 | 11/2010 | Hsieh et al. |
| 2010/0295795 A1 | 11/2010 | Wilairat |
| 2010/0302172 A1 | 12/2010 | Wilairat |
| 2010/0302712 A1 | 12/2010 | Zednicek et al. |
| 2010/0306702 A1 | 12/2010 | Warner |
| 2010/0313124 A1 | 12/2010 | Privault et al. |
| 2010/0321326 A1 | 12/2010 | Grunthaner et al. |
| 2011/0012841 A1 | 1/2011 | Lin |
| 2011/0018821 A1 | 1/2011 | Kii |
| 2011/0041096 A1 | 2/2011 | Larco et al. |
| 2011/0043472 A1 | 2/2011 | Hada |
| 2011/0043475 A1 | 2/2011 | Rigazio et al. |
| 2011/0050594 A1 | 3/2011 | Kim et al. |
| 2011/0055729 A1 | 3/2011 | Mason et al. |
| 2011/0055753 A1 | 3/2011 | Horodezky et al. |
| 2011/0072036 A1 | 3/2011 | Agsen et al. |
| 2011/0107220 A1 | 5/2011 | Perlman |
| 2011/0115735 A1 | 5/2011 | Lev et al. |
| 2011/0115784 A1 | 5/2011 | Tartz et al. |
| 2011/0117526 A1 | 5/2011 | Wigdor et al. |
| 2011/0126094 A1 | 5/2011 | Horodezky et al. |
| 2011/0143769 A1 | 6/2011 | Jones et al. |
| 2011/0159915 A1 | 6/2011 | Yano et al. |
| 2011/0167092 A1 | 7/2011 | Subramaniam et al. |
| 2011/0167336 A1 | 7/2011 | Aitken et al. |
| 2011/0167350 A1 | 7/2011 | Hoellwarth |
| 2011/0167391 A1 | 7/2011 | Momeyer et al. |
| 2011/0169749 A1 | 7/2011 | Ganey et al. |
| 2011/0181524 A1 | 7/2011 | Hinckley |
| 2011/0185299 A1 | 7/2011 | Hinckley |
| 2011/0185300 A1 | 7/2011 | Hinckley et al. |
| 2011/0185318 A1 | 7/2011 | Hinckley et al. |
| 2011/0185320 A1 | 7/2011 | Hinckley |
| 2011/0187647 A1 | 8/2011 | Woloszynski et al. |
| 2011/0191704 A1 | 8/2011 | Hinckley |
| 2011/0191718 A1 | 8/2011 | Hinckley |
| 2011/0191719 A1 | 8/2011 | Hinckley |
| 2011/0199386 A1 | 8/2011 | Dharwada et al. |
| 2011/0205163 A1 | 8/2011 | Hinckley |
| 2011/0209039 A1 | 8/2011 | Hinckley et al. |
| 2011/0209057 A1 | 8/2011 | Hinckley |
| 2011/0209058 A1 | 8/2011 | Hinckley |
| 2011/0209088 A1 | 8/2011 | Hinckley |
| 2011/0209089 A1 | 8/2011 | Hinckley et al. |
| 2011/0209093 A1 | 8/2011 | Hinckley |
| 2011/0209097 A1 | 8/2011 | Hinckley |
| 2011/0209098 A1 | 8/2011 | Hinckley et al. |
| 2011/0209099 A1 | 8/2011 | Hinckley |
| 2011/0209100 A1 | 8/2011 | Hinckley et al. |
| 2011/0209101 A1 | 8/2011 | Hinckley et al. |
| 2011/0209102 A1 | 8/2011 | Hinckley et al. |
| 2011/0209103 A1 | 8/2011 | Hinckley et al. |
| 2011/0209104 A1 | 8/2011 | Hinckley et al. |
| 2011/0231796 A1 | 9/2011 | Vigil |
| 2011/0242039 A1 | 10/2011 | Kalis et al. |
| 2011/0242138 A1 | 10/2011 | Tribble |
| 2011/0261058 A1 | 10/2011 | Luo |
| 2011/0291948 A1 | 12/2011 | Stewart et al. |
| 2011/0291964 A1 | 12/2011 | Chambers et al. |
| 2011/0310459 A1 | 12/2011 | Gates et al. |
| 2012/0001861 A1 | 1/2012 | Townsend et al. |
| 2012/0032979 A1 | 2/2012 | Blow et al. |
| 2012/0075194 A1 | 3/2012 | Ferren |
| 2012/0084705 A1 | 4/2012 | Lee et al. |
| 2012/0096411 A1 | 4/2012 | Nash |
| 2012/0113007 A1 | 5/2012 | Koch et al. |
| 2012/0131454 A1 | 5/2012 | Shah |
| 2012/0154303 A1 | 6/2012 | Lazaridis et al. |
| 2012/0158629 A1 | 6/2012 | Hinckley et al. |
| 2012/0212445 A1 | 8/2012 | Heikkinen et al. |
| 2012/0236026 A1 | 9/2012 | Hinckley |
| 2012/0262407 A1 | 10/2012 | Hinckley et al. |
| 2012/0287076 A1 | 11/2012 | Dao et al. |
| 2012/0304133 A1 | 11/2012 | Nan et al. |
| 2012/0306788 A1 | 12/2012 | Chen et al. |
| 2012/0311476 A1 | 12/2012 | Campbell |
| 2012/0324384 A1 | 12/2012 | Cohen et al. |
| 2013/0038564 A1 | 2/2013 | Ho |
| 2013/0044070 A1 | 2/2013 | Townsend et al. |
| 2013/0063891 A1 | 3/2013 | Martisauskas |
| 2013/0088434 A1 | 4/2013 | Masuda et al. |
| 2013/0093691 A1 | 4/2013 | Moosavi |
| 2013/0117715 A1 | 5/2013 | Williams et al. |
| 2013/0154999 A1 | 6/2013 | Guard |
| 2013/0181902 A1 | 7/2013 | Hinckley |
| 2013/0222287 A1 | 8/2013 | Bae et al. |
| 2013/0257768 A1 | 10/2013 | Lee et al. |
| 2013/0265269 A1 | 10/2013 | Sharma et al. |
| 2013/0271447 A1 | 10/2013 | Setlur et al. |
| 2013/0275914 A1 | 10/2013 | Zhuo |
| 2013/0300668 A1 | 11/2013 | Churikov |
| 2013/0335453 A1 | 12/2013 | Lim et al. |
| 2014/0022183 A1 | 1/2014 | Ayoub et al. |
| 2014/0043265 A1 | 2/2014 | Chang et al. |
| 2014/0043277 A1 | 2/2014 | Saukko et al. |
| 2014/0055367 A1* | 2/2014 | Dearman ............ G06F 3/0488 345/173 |
| 2014/0092041 A1 | 4/2014 | Ih |
| 2014/0111462 A1 | 4/2014 | Townsend et al. |
| 2014/0132551 A1 | 5/2014 | Bathiche |
| 2014/0192019 A1 | 7/2014 | Fukushima |
| 2014/0195957 A1 | 7/2014 | Bang |
| 2014/0253477 A1 | 9/2014 | Shim et al. |
| 2014/0289668 A1 | 9/2014 | Mavrody |
| 2014/0293145 A1 | 10/2014 | Jones et al. |
| 2014/0337791 A1 | 11/2014 | Agnetta et al. |
| 2015/0042588 A1 | 2/2015 | Park |
| 2015/0145797 A1 | 5/2015 | Corrion |
| 2015/0160849 A1 | 6/2015 | Weiss et al. |
| 2015/0227166 A1 | 8/2015 | Lee et al. |
| 2015/0261362 A1 | 9/2015 | King |
| 2015/0261364 A1 | 9/2015 | Cady et al. |
| 2016/0110024 A1 | 4/2016 | Townsend et al. |
| 2016/0283104 A1 | 9/2016 | Hinckley et al. |
| 2016/0291787 A1 | 10/2016 | Cady et al. |
| 2017/0147148 A1 | 5/2017 | Townsend et al. |
| 2017/0177100 A1 | 6/2017 | Townsend et al. |
| 2017/0177101 A1 | 6/2017 | Townsend et al. |

FOREIGN PATENT DOCUMENTS

| | | |
|---|---|---|
| CN | 1704888 | 12/2005 |
| CN | 1766824 | 5/2006 |
| CN | 1936799 | 3/2007 |
| CN | 101198925 | 6/2008 |
| CN | 201181467 | 1/2009 |
| CN | 101404687 | 4/2009 |
| CN | 101410781 | 4/2009 |
| CN | 101432677 | 5/2009 |
| CN | 101482790 | 7/2009 |
| CN | 101496404 | 7/2009 |
| CN | 201298220 | 8/2009 |
| CN | 101551728 | 10/2009 |
| CN | 101566865 | 10/2009 |
| CN | 101576789 | 11/2009 |
| CN | 101609383 | 12/2009 |
| CN | 101627361 | 1/2010 |
| CN | 101636711 | 1/2010 |
| CN | 101668056 | 3/2010 |
| CN | 102207788 | 10/2011 |
| EP | 0388344 | 2/1995 |
| EP | 1942401 | 7/2008 |
| EP | 2081107 | 7/2009 |
| EP | 2148268 | 1/2010 |

(56) References Cited

FOREIGN PATENT DOCUMENTS

| | | |
|---|---|---|
| EP | 2466442 | 6/2012 |
| EP | 2261781 | 10/2012 |
| EP | 2560088 | 2/2013 |
| EP | 2634678 | 9/2013 |
| JP | 6282368 | 10/1994 |
| JP | 7281810 | 10/1995 |
| JP | 2001265523 | 9/2001 |
| JP | 2001290585 | 10/2001 |
| JP | 2002055753 | 2/2002 |
| JP | 2003195998 | 7/2003 |
| JP | 2005004690 | 1/2005 |
| JP | 2005026834 | 1/2005 |
| JP | 2005122271 | 5/2005 |
| JP | 2005149279 | 6/2005 |
| JP | 2007240964 | 9/2007 |
| JP | 3143462 | 7/2008 |
| JP | 2008532185 | 8/2008 |
| JP | 2008217742 | 9/2008 |
| JP | 2008305087 | 12/2008 |
| JP | 2009097724 | 4/2009 |
| JP | 2010019643 | 1/2010 |
| JP | 2010026834 | 2/2010 |
| JP | 2010250465 | 11/2010 |
| KR | 20090013927 | 2/2009 |
| KR | 1020090088501 | 8/2009 |
| KR | 20090106755 | 10/2009 |
| TW | 200921478 | 5/2009 |
| TW | 200947297 | 11/2009 |
| TW | 200951783 | 12/2009 |
| WO | WO-9928812 | 1/1999 |
| WO | WO-2009086628 | 7/2009 |
| WO | WO-2009131987 | 10/2009 |
| WO | WO-2011106467 | 9/2011 |
| WO | WO-2011106468 | 9/2011 |

OTHER PUBLICATIONS

"Advisory Action", U.S. Appl. No. 12/695,842, dated May 12, 2015, 3 pages.
"Decision on Reexamination", CN Application No. 201110046519.X, dated May 28, 2015, 9 Pages.
"Extended European Search Report", EP Application No. 13738283.4, dated Aug. 4, 2015, 7 pages.
"Final Office Action", U.S. Appl. No. 12/695,842, dated Feb. 2, 2016, 10 pages.
"Final Office Action", U.S. Appl. No. 12/695,976, dated Aug. 5, 2015, 12 pages.
"Final Office Action", U.S. Appl. No. 12/695,976, dated Nov. 27, 2015, 11 pages.
"Final Office Action", U.S. Appl. No. 12/700,357, dated Aug. 31, 2015, 14 pages.
"Final Office Action", U.S. Appl. No. 12/700,510, dated Mar. 14, 2016, 36 pages.
"Final Office Action", U.S. Appl. No. 12/709,282, dated Aug. 24, 2015, 24 pages.
"Final Office Action", U.S. Appl. No. 12/713,113, dated Aug. 5, 2015, 26 pages.
"Final Office Action", U.S. Appl. No. 12/713,127, dated Jul. 31, 2015, 19 pages.
"Final Office Action", U.S. Appl. No. 13/352,193, dated Oct. 1, 2015, 23 pages.
"Final Office Action", U.S. Appl. No. 13/484,075, dated Jul. 16, 2015, 10 pages.
"Final Office Action", U.S. Appl. No. 13/484,075, dated Nov. 10, 2015, 11 pages.
"Final Office Action", U.S. Appl. No. 13/898,452, dated May 19, 2017, 24 pages.
"Foreign Notice of Allowance", CN Application No. 201180009579.2, dated Mar. 7, 2016, 4 Pages.
"Foreign Notice of Allowance", CN Application No. 201180010769.6, dated Apr. 30, 2015, 4 Pages.
"Foreign Notice of Allowance", CN Application No. 201180011039.8, dated Jan. 13, 2016, 4 Pages.
"Foreign Notice of Allowance", CN Application No. 201380005804.4, dated Sep. 30, 2016, 4 pages.
"Foreign Office Action", CN Application No. 201180010692.2, dated Mar. 28, 2016, 7 Pages.
"Foreign Office Action", CN Application No. 201180009579.2, dated Apr. 21, 2015, 16 Pages.
"Foreign Office Action", CN Application No. 201180009635.2, dated Jul. 28, 2014, 13 pages.
"Foreign Office Action", CN Application No. 201180010692.2, dated Sep. 15, 2015, 10 Pages.
"Foreign Office Action", CN Application No. 201180011039.8, dated Sep. 6, 2015, 7 pages.
"Foreign Office Action", CN Application No. 201380005804.4, dated Mar. 1, 2016, 13 Pages.
"Foreign Office Action", EP Application No. 11737428.0, dated Nov. 18, 2013, 4 pages.
"Foreign Office Action", EP Application No. 15713073.3, dated Mar. 16, 2017, 4 pages.
"Non-Final Office Action", U.S. Appl. No. 12/695,842, dated Aug. 13, 2015, 18 pages.
"Non-Final Office Action", U.S. Appl. No. 12/700,357, dated Dec. 16, 2015, 10 pages.
"Non-Final Office Action", U.S. Appl. No. 12/700,510, dated Aug. 28, 2015, 34 pages.
"Non-Final Office Action", U.S. Appl. No. 12/709,204, dated May 7, 2015, 14 pages.
"Non-Final Office Action", U.S. Appl. No. 12/713,096, dated Dec. 30, 2015, 5 pages.
"Non-Final Office Action", U.S. Appl. No. 13/352,193, dated Mar. 22, 2016, 23 pages.
"Non-Final Office Action", U.S. Appl. No. 13/484,075, dated Apr. 29, 2015, 8 pages.
"Non-Final Office Action", U.S. Appl. No. 15/142,758, dated May 19, 2017, 12 pages.
"Notice of Allowance", U.S. Appl. No. 12/709,204, dated Sep. 25, 2015, 7 pages.
"Notice of Allowance", U.S. Appl. No. 13/352,193, dated Jul. 29, 2016, 10 pages.
"Search Report", TW Application No. 099142890, dated Jun. 30, 2015, 1 page.
"Supplemental Notice of Allowance", U.S. Appl. No. 13/352,193, dated Nov. 14, 2016, 2 pages.
"Supplementary European Search Report", EP Application No. 11737428.0, dated Nov. 13, 2004, 3 pages.
Sax,"Liquid Keyboard: An Ergonomic, Adaptive QWERTY Keyboard for Touchscreens and Surfaces", ICDS 2011, The Fifth International Conference on Digital Society, Feb. 23, 2011, 6 pages.
"International Search Report and Written Opinion Issued in PCT Application No. PCT/US2013/069644", dated Jan. 8, 2014, 11 Pages.
"Second Office Action and Search Report Issued in Chinese Patent Application No. 201380059094.3", dated Aug. 17, 2017, 17 pages.
"Non-Final Office Action Issued in U.S. Appl. No. 15/453,403", dated Jun. 30, 2017, 6 pages.
"Third Office Action Issued in Chinese Patent Application No. 201380059094.3", dated Nov. 23, 2017, 6 Pages.
"3M Touch Systems, Inc. Announces Shipment of Dispersive Signal Technology Product", Datasheet, 3M Corporation, retrieved from <http://solutions.3m.com/wps/portal/3M/en_US/TouchSystems/TouchScreen/Informatio/Media/PressReleases/Archive/?PC_7_RJH9U52300FA602N9RSR991OI3000000_assetId=1114287537178<, Sep. 6, 2005, 3 pages.
"3M TouchWare TM Software for Windows User Guide", In White Paper of 3M Touch Systems—Retrieved at: <<http://multimedia.3m.com/mws/mediawebserver?6666660Zjcf6IVs6EVs66SS0LCOrrrrQ->>, Aug. 9, 2013, 65 pages.
"AccuScribe Touchscreens", Datasheet, Elo TouchSystem, Aug. 2005, 2 pages.
"Advisory Action", U.S. Appl. No. 12/709,376, dated Dec. 19, 2013, 2 pages.

(56) References Cited

OTHER PUBLICATIONS

"Apple Unibody MacBook Pro #MB991LL/A 2.53 GHz Intel Core 2 Duo", Retrieved from: <http://www.themacstore.com/parts/show/c-nmb3-mb991ll__a> on Nov. 10, 2009, 2009, 12 pages.
"Corrected Notice of Allowance", U.S. Appl. No. 13/674,357, dated Jan. 26, 2017, 2 pages.
"Corrected Notice of Allowance", U.S. Appl. No. 13/674,357, dated Nov. 14, 2016, 2 pages.
"Corrected Notice of Allowance", U.S. Appl. No. 14/212,916, dated Mar. 3, 2016, 2 pages.
"Corrected Notice of Allowance", U.S. Appl. No. 14/212,916, dated May 9, 2016, 2 pages.
"Corrected Notice of Allowance", U.S. Appl. No. 14/212,916, dated May 26, 2016, 6 pages.
"Decision on Reexamination", CN Application No. 201110044285.5, dated Mar. 26, 2015, 14 Pages.
"Dell and Windows 7—The Wait Is Over", Retrieved from: <http://content.dell.com/us/en/corp/d/press-releases/2009-10-22-Dell-and-Windows-7.aspx> on Nov. 10, 2009, Oct. 22, 2009, 2 pages.
"Ex Parte Mewherter, PTAB precedential decision", U.S. Appl. No. 10/685,192, dated May 8, 2013, 22 pages.
"Final Office Action", U.S. Appl. No. 11/324,157, dated Jun. 24, 2009, 14 pages.
"Final Office Action", U.S. Appl. No. 11/324,157, dated Oct. 15, 2010, 18 pages.
"Final Office Action", U.S. Appl. No. 12/472,699, dated Jul. 29, 2013, 12 pages.
"Final Office Action", U.S. Appl. No. 12/472,699, dated Feb. 15, 2012, 12 pages.
"Final Office Action", U.S. Appl. No. 12/695,842, dated Feb. 12, 2015, 20 pages.
"Final Office Action", U.S. Appl. No. 12/695,842, dated Dec. 2, 2013, 17 pages.
"Final Office Action", U.S. Appl. No. 12/695,937, dated Apr. 2, 2015, 14 pages.
"Final Office Action", U.S. Appl. No. 12/695,937, dated Nov. 10, 2014, 13 pages.
"Final Office Action", U.S. Appl. No. 12/695,937, dated Jul. 26, 2012, 13 pages.
"Final Office Action", U.S. Appl. No. 12/695,976, dated Jul. 23, 2014, 12 pages.
"Final Office Action", U.S. Appl. No. 12/695,976, dated Nov. 21, 2012, 10 pages.
"Final Office Action", U.S. Appl. No. 12/700,357, dated Oct. 24, 2012, 13 pages.
"Final Office Action", U.S. Appl. No. 12/700,357, dated Nov. 20, 2014, 12 pages.
"Final Office Action", U.S. Appl. No. 12/700,460, dated Aug. 28, 2012, 26 pages.
"Final Office Action", U.S. Appl. No. 12/700,510, dated Feb. 3, 2015, 28 pages.
"Final Office Action", U.S. Appl. No. 12/700,510, dated Oct. 10, 2012, 23 pages.
"Final Office Action", U.S. Appl. No. 12/709,204, dated Jan. 12, 2015, 29 pages.
"Final Office Action", U.S. Appl. No. 12/709,204, dated Apr. 11, 2014, 24 pages.
"Final Office Action", U.S. Appl. No. 12/709,204, dated Sep. 12, 2013, 24 pages.
"Final Office Action", U.S. Appl. No. 12/709,204, dated Oct. 3, 2012, 24 pages.
"Final Office Action", U.S. Appl. No. 12/709,245, dated Mar. 15, 2013, 16 pages.
"Final Office Action", U.S. Appl. No. 12/709,245, dated Jan. 6, 2012, 13 pages.
"Final Office Action", U.S. Appl. No. 12/709,245, dated Nov. 14, 2014, 6 pages.
"Final Office Action", U.S. Appl. No. 12/709,282, dated May 9, 2014, 17 pages.
"Final Office Action", U.S. Appl. No. 12/709,282, dated Dec. 24, 2012, 11 pages.
"Final Office Action", U.S. Appl. No. 12/709,282, dated Jul. 16, 2013, 11 pages.
"Final Office Action", U.S. Appl. No. 12/709,301, dated Jan. 7, 2013, 14 pages.
"Final Office Action", U.S. Appl. No. 12/709,301, dated Sep. 3, 2013, 12 pages.
"Final Office Action", U.S. Appl. No. 12/709,301, dated Mar. 1, 2012, 11 pages.
"Final Office Action", U.S. Appl. No. 12/709,348, dated Jan. 7, 2013, 15 pages.
"Final Office Action", U.S. Appl. No. 12/709,348, dated Sep. 12, 2013, 12 pages.
"Final Office Action", U.S. Appl. No. 12/709,348, dated Feb. 17, 2012, 13 pages.
"Final Office Action", U.S. Appl. No. 12/709,376, dated Sep. 10, 2013, 12 pages.
"Final Office Action", U.S. Appl. No. 12/709,376, dated Nov. 8, 2012, 20 pages.
"Final Office Action", U.S. Appl. No. 12/709,376, dated Mar. 30, 2012, 16 pages.
"Final Office Action", U.S. Appl. No. 12/713,053, dated Aug. 17, 2012, 10 pages.
"Final Office Action", U.S. Appl. No. 12/713,081, dated May 9, 2012, 19 pages.
"Final Office Action", U.S. Appl. No. 12/713,096, dated Feb. 15, 2013, 7 pages.
"Final Office Action", U.S. Appl. No. 12/713,110, dated Jan. 17, 2013, 10 pages.
"Final Office Action", U.S. Appl. No. 12/713,113, dated Oct. 8, 2013, 21 pages.
"Final Office Action", U.S. Appl. No. 12/713,113, dated Oct. 8, 2014, 12 pages.
"Final Office Action", U.S. Appl. No. 12/713,113, dated Jun. 4, 2012, 18 pages.
"Final Office Action", U.S. Appl. No. 12/713,118, dated Oct. 26, 2012, 10 pages.
"Final Office Action", U.S. Appl. No. 12/713,127, dated Aug. 14, 2014, 15 pages.
"Final Office Action", U.S. Appl. No. 12/713,127, dated Jun. 6, 2012, 18 pages.
"Final Office Action", U.S. Appl. No. 12/713,130, dated Jun. 29, 2012, 8 pages.
"Final Office Action", U.S. Appl. No. 12/713,133, dated May 20, 2013, 10 pages.
"Final Office Action", U.S. Appl. No. 12/713,133, dated Jul. 2, 2012, 8 pages.
"Final Office Action", U.S. Appl. No. 13/352,193, dated Jan. 12, 2015, 22 pages.
"Final Office Action", U.S. Appl. No. 13/352,193, dated May 23, 2014, 23 pages.
"Final Office Action", U.S. Appl. No. 13/484,075, dated Feb. 4, 2015, 12 pages.
"Final Office Action", U.S. Appl. No. 13/484,075, dated May 21, 2013, 10 pages.
"Final Office Action", U.S. Appl. No. 13/674,357, dated Jan. 29, 2015, 10 pages.
"Final Office Action", U.S. Appl. No. 13/674,357, dated Jul. 27, 2016, 9 pages.
"Final Office Action", U.S. Appl. No. 13/674,357, dated Sep. 17, 2015, 12 pages.
"Final Office Action", U.S. Appl. No. 13/898,452, dated Mar. 10, 2016, 25 pages.
"Final Office Action", U.S. Appl. No. 13/898,452, dated Mar. 27, 2015, 23 pages.
"Final Office Action", U.S. Appl. No. 13/898,452, dated Jun. 9, 2014, 26 pages.
"Final Office Action", U.S. Appl. No. 14/099,798, dated Nov. 25, 2015, 19 pages.
"Final Office Action", U.S. Appl. No. 14/145,204, dated Nov. 12, 2014, 10 pages.

(56) References Cited

OTHER PUBLICATIONS

"Foreign Office Action", CN Application No. 201110050852.8, dated Nov. 1, 2013, 8 Pages.
"Foreign Notice of Allowance", CN Application No. 201110046510.9, dated Feb. 12, 2015, 6 Pages.
"Foreign Notice of Allowance", CN Application No. 201110046519.X, dated Aug. 2, 2016, 4 pages.
"Foreign Notice of Allowance", CN Application No. 201110050506.X, dated Nov. 2, 2014, 4 Pages.
"Foreign Notice of Allowance", JP Application No. 2012-555062, dated Mar. 3, 2015, 4 Pages.
"Foreign Office Action", CN Application No. 201110044285.5, dated Apr. 24, 2013, 8 pages.
"Foreign Office Action", CN Application No. 201110044285.5, dated Jun. 20, 2012, 12 pages.
"Foreign Office Action", CN Application No. 201110044285.5, dated Jan. 4, 2013, 13 pages.
"Foreign Office Action", CN Application No. 201110044285.5, dated Dec. 22, 2014, 8 Pages.
"Foreign Office Action", CN Application No. 201110046510.9, dated Feb. 12, 2014, 9 Pages.
"Foreign Office Action", CN Application No. 201110046510.9, dated Jul. 25, 2014, 11 Pages.
"Foreign Office Action", CN Application No. 201110046510.9, dated May 31, 2013, 11 pages.
"Foreign Office Action", CN Application No. 201110046519.X, dated Mar. 19, 2013, 12 pages.
"Foreign Office Action", CN Application No. 201110046519.X, dated Sep. 21, 2015, 16 Pages.
"Foreign Office Action", CN Application No. 201110046519.X, dated Aug. 2, 2012, 13 pages.
"Foreign Office Action", CN Application No. 201110046519.X, dated Aug. 6, 2013, 11 pages.
"Foreign Office Action", CN Application No. 201110046529.3, dated Feb. 4, 2013, 9 pages.
"Foreign Office Action", CN Application No. 201110046529.3, dated Aug. 16, 2012, 14 pages.
"Foreign Office Action", CN Application No. 201110046529.3, dated Aug. 6, 2013, 11 pages.
"Foreign Office Action", CN Application No. 201110050499.3, dated Nov. 27, 2012, 8 pages.
"Foreign Office Action", CN Application No. 201110050499.3, dated Aug. 3, 2012, 8 pages.
"Foreign Office Action", CN Application No. 201110050506.X, dated Apr. 2, 2013, 11 pages.
"Foreign Office Action", CN Application No. 201110050506.X, dated Feb. 26, 2014, 6 pages.
"Foreign Office Action", CN Application No. 201110050508.9, dated Mar. 7, 2013, 8 pages.
"Foreign Office Action", CN Application No. 201110050508.9, dated Aug. 3, 2012, 8 pages.
"Foreign Office Action", CN Application No. 201110050852.8, dated Mar. 26, 2013, 11 pages.
"Foreign Office Action", CN Application No. 201180007100.1, dated May 15, 2015, 20 Pages.
"Foreign Office Action", CN Application No. 201180007100.1, dated Sep. 10, 2014, 22 pages.
"Foreign Office Action", CN Application No. 201180009579.2, dated Sep. 6, 2015, 19 pages.
"Foreign Office Action", CN Application No. 201180009579.2, dated Nov. 4, 2014, 16 pages.
"Foreign Office Action", CN Application No. 201180010692.2, dated Mar. 10, 2015, 9 Pages.
"Foreign Office Action", CN Application No. 201180010692.2, dated Jun. 26, 2014, 13 pages.
"Foreign Office Action", CN Application No. 201180010769.6, dated Sep. 3, 2014, 12 Pages.
"Foreign Office Action", CN Application No. 201180011020.3, dated Jan. 15, 2015, 9 Pages.
"Foreign Office Action", CN Application No. 201180011020.3, dated May 4, 2014, 12 Pages.
"Foreign Office Action", CN Application No. 201180011039.8, dated Feb. 17, 2015, 17 Pages.
"Foreign Office Action", CN Application No. 201180011039.8, dated Jun. 5, 2014, 16 Pages.
"Foreign Office Action", CN Application No. 201380059094.3, dated Dec. 1, 2016, 15 pages.
"Foreign Office Action", EP Application No. 11747907.1, dated Jan. 28, 2013, 5 pages.
"Foreign Office Action", EP Application No. 11748026.9, dated Jan. 16, 2013, 5 pages.
"Foreign Office Action", EP Application No. 11748027.7, dated Jan. 18, 2013, 5 pages.
"Foreign Office Action", EP Application No. 11748028.5, dated Jan. 28, 2013, 5 pages.
"Foreign Office Action", EP Application No. 11748029.3, dated Jan. 16, 2013, 5 pages.
"Foreign Office Action", JP Application No. 2012-554008, dated Jun. 25, 2015, 13 pages.
"Foreign Office Action", JP Application No. 2012-554008, dated Nov. 25, 2014, 7 pages.
"In touch with new opportunities—Dispersive Signal Technology", DataSheet, NXT, 2005, 1 page.
"International Preliminary Report on Patentability", Application No. PCT/US2014/067804, dated Feb. 22, 2016, 9 pages.
"International Search Report and Written Opinion", Application No. PCT/US2011/025132, dated Oct. 26, 2011, 10 pages.
"International Search Report and Written Opinion", Application No. PCT/US2011/025131, dated Oct. 31, 2011, 10 pages.
"International Search Report and Written Opinion", Application No. PCT/US2013/020413, dated Apr. 8, 2013, 10 pages.
"International Search Report and Written Opinion", Application No. PCT/US2015/019811, dated Jul. 8, 2015, 11 pages.
"International Search Report and Written Opinion", Application No. PCT/US2011/025973, dated Oct. 27, 2011, 13 pages.
"International Search Report and Written Opinion", Application No. PCT/US/2011025972, dated Sep. 30, 2011, 14 pages.
"International Search Report and Written Opinion", Application No. PCT/US2011/025575, dated Sep. 30, 2011, 14 pages.
"International Search Report and Written Opinion", Application No. PCT/US2011/025971, dated Oct. 31, 2011, 15 pages.
"International Search Report and Written Opinion", Application No. PCT/US2014/067804, dated Jul. 24, 2015, 19 Pages.
"International Search Report and Written Opinion", Application No. PCT/US2011/020417, dated Oct. 20, 2011, 8 pages.
"International Search Report and Written Opinion", Application No. PCT/US2011/025974, dated Oct. 26, 2011, 8 pages.
"International Search Report and Written Opinion", Application No. PCT/US2011/020412, dated Aug. 31, 2011, 9 pages.
"International Search Report and Written Opinion", Application No. PCT/US2011/020410, dated Sep. 27, 2011, 9 pages.
"iQuery & Css Example—Dropdown Menu", DesignReviver, Retrieved from: <http://designreviver.com/tutorials/jquery-css-example-dropdown-menu/> on Nov. 22, 2011, Oct. 7, 2008, 30 pages.
"New MS Courier Leak Details Multi-Touch Interface", Retrieved from: <http://www.electronista.com/articles/09/11/04/couriergestures.ui.explained/> on Nov. 10, 2009, Nov. 4, 2009, 9 pages.
"Non-Final Office Action", U.S. Appl. No. 11/324,157, dated Apr. 28, 2010, 16 pages.
"Non-Final Office Action", U.S. Appl. No. 11/324,157, dated Sep. 28, 2009, 17 pages.
"Non-Final Office Action", U.S. Appl. No. 11/324,157, dated Dec. 11, 2008, 12 pages.
"Non-Final Office Action", U.S. Appl. No. 12/472,699, dated Mar. 28, 2013, 10 pages.
"Non-Final Office Action", U.S. Appl. No. 12/472,699, dated Oct. 23, 2013, 14 pages.
"Non-Final Office Action", U.S. Appl. No. 12/472,699, dated Sep. 12, 2011, 12 pages.
"Non-Final Office Action", U.S. Appl. No. 12/695,842, dated May 22, 2013, 16 pages.

(56) References Cited

OTHER PUBLICATIONS

"Non-Final Office Action", U.S. Appl. No. 12/695,842, dated Aug. 18, 2014, 21 pages.
"Non-Final Office Action", U.S. Appl. No. 12/695,842, dated Oct. 3, 2012, 16 pages.
"Non-Final Office Action", U.S. Appl. No. 12/695,937, dated May 7, 2014, 11 pages.
"Non-Final Office Action", U.S. Appl. No. 12/695,937, dated Apr. 25, 2012, 14 pages.
"Non-Final Office Action", U.S. Appl. No. 12/695,976, dated Mar. 25, 2015, 10 pages.
"Non-Final Office Action", U.S. Appl. No. 12/695,976, dated Sep. 11, 2012, 8 pages.
"Non-Final Office Action", U.S. Appl. No. 12/700,357, dated Apr. 2, 2015, 12 pages.
"Non-Final Office Action", U.S. Appl. No. 12/700,357, dated Jun. 26, 2014, 11 pages.
"Non-Final Office Action", U.S. Appl. No. 12/700,357, dated Jul. 2, 2012, 10 pages.
"Non-Final Office Action", U.S. Appl. No. 12/700,460, dated Jan. 13, 2012, 21 pages.
"Non-Final Office Action", U.S. Appl. No. 12/700,510, dated Jun. 12, 2014, 26 pages.
"Non-Final Office Action", U.S. Appl. No. 12/700,510, dated Feb. 7, 2012, 20 pages.
"Non-Final Office Action", U.S. Appl. No. 12/709,204, dated Jun. 6, 2013, 27 pages.
"Non-Final Office Action", U.S. Appl. No. 12/709,204, dated Aug. 13, 2014, 25 pages.
"Non-Final Office Action", U.S. Appl. No. 12/709,204, dated Nov. 20, 2013, 31 pages.
"Non-Final Office Action", U.S. Appl. No. 12/709,204, dated May 10, 2012, 20 pages.
"Non-Final Office Action", U.S. Appl. No. 12/709,245, dated Mar. 20, 2014, 16 pages.
"Non-Final Office Action", U.S. Appl. No. 12/709,245, dated May 30, 2013, 15 pages.
"Non-Final Office Action", U.S. Appl. No. 12/709,245, dated Nov. 30, 2011, 11 pages.
"Non-Final Office Action", U.S. Appl. No. 12/709,245, dated Mar. 21, 2012, 14 pages.
"Non-Final Office Action", U.S. Appl. No. 12/709,282, dated Jan. 29, 2015, 22 pages.
"Non-Final Office Action", U.S. Appl. No. 12/709,282, dated Feb. 28, 2013, 11 pages.
"Non-Final Office Action", U.S. Appl. No. 12/709,282, dated Oct. 10, 2013, 12 pages.
"Non-Final Office Action", U.S. Appl. No. 12/709,282, dated Apr. 12, 2012, 9 pages.
"Non-Final Office Action", U.S. Appl. No. 12/709,301, dated Jan. 16, 2015, 5 pages.
"Non-Final Office Action", U.S. Appl. No. 12/709,301, dated May 14, 2013, 14 pages.
"Non-Final Office Action", U.S. Appl. No. 12/709,301, dated May 23, 2014, 12 pages.
"Non-Final Office Action", U.S. Appl. No. 12/709,301, dated Jul. 14, 2015, 11 pages.
"Non-Final Office Action", U.S. Appl. No. 12/709,301, dated Oct. 24, 2013, 11 pages.
"Non-Final Office Action", U.S. Appl. No. 12/709,301, dated Nov. 19, 2015, 8 pages.
"Non-Final Office Action", U.S. Appl. No. 12/709,301, dated Nov. 28, 2011, 9 pages.
"Non-Final Office Action", U.S. Appl. No. 12/709,301, dated Sep. 13, 2012, 13 pages.
"Non-Final Office Action", U.S. Appl. No. 12/709,348, dated Apr. 25, 2013, 15 pages.
"Non-Final Office Action", U.S. Appl. No. 12/709,348, dated Dec. 20, 2013, 9 pages.
"Non-Final Office Action", U.S. Appl. No. 12/709,348, dated Dec. 7, 2011, 12 pages.
"Non-Final Office Action", U.S. Appl. No. 12/709,348, dated Aug. 2, 2012, 14 pages.
"Non-Final Office Action", U.S. Appl. No. 12/709,376, dated May 23, 2013, 17 pages.
"Non-Final Office Action", U.S. Appl. No. 12/709,376, dated Jan. 23, 2012, 14 pages.
"Non-Final Office Action", U.S. Appl. No. 12/709,376, dated Aug. 17, 2012, 17 pages.
"Non-Final Office Action", U.S. Appl. No. 12/713,053, dated Nov. 23, 2012, 13 pages.
"Non-Final Office Action", U.S. Appl. No. 12/713,053, dated Feb. 3, 2012, 8 pages.
"Non-Final Office Action", U.S. Appl. No. 12/713,081, dated Nov. 29, 2012, 9 pages.
"Non-Final Office Action", U.S. Appl. No. 12/713,081, dated Dec. 23, 2011, 18 pages.
"Non-Final Office Action", U.S. Appl. No. 12/713,096, dated Jan. 30, 2014, 23 pages.
"Non-Final Office Action", U.S. Appl. No. 12/713,096, dated Jun. 26, 2013, 8 pages.
"Non-Final Office Action", U.S. Appl. No. 12/713,096, dated Jun. 6, 2012, 9 pages.
"Non-Final Office Action", U.S. Appl. No. 12/713,110, dated May 3, 2013, 10 pages.
"Non-Final Office Action", U.S. Appl. No. 12/713,110, dated Jun. 21, 2012, 21 pages.
"Non-Final Office Action", U.S. Appl. No. 12/713,113, dated Feb. 12, 2015, 24 pages.
"Non-Final Office Action", U.S. Appl. No. 12/713,113, dated Apr. 23, 2013, 18 pages.
"Non-Final Office Action", U.S. Appl. No. 12/713,113, dated Jun. 4, 2014, 11 pages.
"Non-Final Office Action", U.S. Appl. No. 12/713,113, dated Dec. 22, 2011, 20 pages.
"Non-Final Office Action", U.S. Appl. No. 12/713,118, dated Jan. 29, 2015, 11 pages.
"Non-Final Office Action", U.S. Appl. No. 12/713,118, dated Jun. 8, 2012, 7 pages.
"Non-Final Office Action", U.S. Appl. No. 12/713,127, dated Jan. 31, 2014, 21 pages.
"Non-Final Office Action", U.S. Appl. No. 12/713,127, dated Mar. 26, 2015, 18 pages.
"Non-Final Office Action", U.S. Appl. No. 12/713,127, dated Dec. 27, 2011, 22 pages.
"Non-Final Office Action", U.S. Appl. No. 12/713,130, dated Jan. 16, 2013, 5 pages.
"Non-Final Office Action", U.S. Appl. No. 12/713,130, dated Jan. 23, 2012, 7 pages.
"Non-Final Office Action", U.S. Appl. No. 12/713,133, dated Jan. 14, 2013, 8 pages.
"Non-Final Office Action", U.S. Appl. No. 12/713,133, dated Jan. 31, 2012, 7 pages.
"Non-Final Office Action", U.S. Appl. No. 12/713,133, dated Dec. 10, 2013, 8 pages.
"Non-Final Office Action", U.S. Appl. No. 13/352,193, dated Jan. 31, 2014, 22 pages.
"Non-Final Office Action", U.S. Appl. No. 13/352,193, dated Apr. 9, 2015, 21 pages.
"Non-Final Office Action", U.S. Appl. No. 13/352,193, dated Aug. 20, 2014, 19 pages.
"Non-Final Office Action", U.S. Appl. No. 13/484,075, dated Jan. 15, 2013, 9 pages.
"Non-Final Office Action", U.S. Appl. No. 13/484,075, dated Sep. 5, 2014, 11 pages.
"Non-Final Office Action", U.S. Appl. No. 13/657,662, dated Apr. 5, 2013, 10 pages.
"Non-Final Office Action", U.S. Appl. No. 13/674,357, dated Feb. 17, 2016, 13 pages.
"Non-Final Office Action", U.S. Appl. No. 13/674,357, dated Jun. 4, 2015, 10 pages.

(56) References Cited

OTHER PUBLICATIONS

"Non-Final Office Action", U.S. Appl. No. 13/674,357, dated Aug. 4, 2014, 8 pages.
"Non-Final Office Action", U.S. Appl. No. 13/898,452, dated Feb. 24, 2014, 24 pages.
"Non-Final Office Action", U.S. Appl. No. 13/898,452, dated Jul. 28, 2016, 26 pages.
"Non-Final Office Action", U.S. Appl. No. 13/898,452, dated Sep. 14, 2015, 23 pages.
"Non-Final Office Action", U.S. Appl. No. 13/898,452, dated Sep. 26, 2014, 21 pages.
"Non-Final Office Action", U.S. Appl. No. 14/099,798, dated Mar. 31, 2016, 18 pages.
"Non-Final Office Action", U.S. Appl. No. 14/099,798, dated Jun. 9, 2015, 15 pages.
"Non-Final Office Action", U.S. Appl. No. 14/145,204, dated Feb. 24, 2015, 9 Pages.
"Non-Final Office Action", U.S. Appl. No. 14/145,204, dated Feb. 5, 2014, 5 pages.
"Non-Final Office Action", U.S. Appl. No. 14/212,916, dated Aug. 7, 2015, 10 pages.
"Non-Final Office Action", U.S. Appl. No. 14/979,910, dated Feb. 22, 2016, 4 pages.
"Notice of Allowance", U.S. Appl. No. 11/324,157, dated May 9, 2011, 8 pages.
"Notice of Allowance", U.S. Appl. No. 12/472,699, dated May 2, 2014, 6 pages.
"Notice of Allowance", U.S. Appl. No. 12/695,064, dated Mar. 28, 2012, 12 pages.
"Notice of Allowance", U.S. Appl. No. 12/695,959, dated Apr. 17, 2012, 13 pages.
"Notice of Allowance", U.S. Appl. No. 12/709,245, dated Jan. 30, 2015, 4 pages.
"Notice of Allowance", U.S. Appl. No. 12/709,245, dated Apr. 28, 2015, 4 pages.
"Notice of Allowance", U.S. Appl. No. 12/709,301, dated Feb. 24, 2016, 7 pages.
"Notice of Allowance", U.S. Appl. No. 12/709,301, dated Sep. 8, 2015, 6 pages.
"Notice of Allowance", U.S. Appl. No. 12/709,376, dated Mar. 17, 2014, 6 pages.
"Notice of Allowance", U.S. Appl. No. 12/713,053, dated Jun. 7, 2013, 7 pages.
"Notice of Allowance", U.S. Appl. No. 12/713,096, dated Jan. 9, 2015, 14 pages.
"Notice of Allowance", U.S. Appl. No. 12/713,096, dated Aug. 29, 2014, 14 pages.
"Notice of Allowance", U.S. Appl. No. 12/713,110, dated Dec. 4, 2013, 13 pages.
"Notice of Allowance", U.S. Appl. No. 12/713,118, dated Mar. 5, 2015, 4 pages.
"Notice of Allowance", U.S. Appl. No. 12/713,130, dated Feb. 19, 2013, 5 pages.
"Notice of Allowance", U.S. Appl. No. 12/713,133, dated Jan. 17, 2014, 4 pages.
"Notice of Allowance", U.S. Appl. No. 13/230,700, dated May 15, 2012, 8 pages.
"Notice of Allowance", U.S. Appl. No. 13/230,700, dated Jun. 21, 2012, 8 pages.
"Notice of Allowance", U.S. Appl. No. 13/657,662, dated Oct. 11, 2013, 7 pages.
"Notice of Allowance", U.S. Appl. No. 13/674,357, dated Oct. 13, 2016, 9 pages.
"Notice of Allowance", U.S. Appl. No. 14/145,204, dated Sep. 25, 2015, 5 pages.
"Notice of Allowance", U.S. Appl. No. 14/212,916, dated Dec. 24, 2015, 8 pages.
"Notice of Allowance", U.S. Appl. No. 14/979,910, dated Aug. 31, 2016, 7 pages.
"Notice of Allowance", U.S. Appl. No. 14/979,910, dated Nov. 1, 2016, 7 pages.
"Notice on Reexamination", CN Application No. 201110044285.5, dated Jul. 23, 2014, 8 Pages.
"Second Written Opinion", Application No. PCT/US2014/067804, dated Nov. 24, 2015, 8 Pages.
"Supplemental Notice of Allowance", U.S. Appl. No. 12/713,096, dated Nov. 4, 2014, 2 pages.
"Supplemental Notice of Allowance", U.S. Appl. No. 12/713,118, dated Mar. 19, 2015, 2 pages.
"Supplemental Notice of Allowance", U.S. Appl. No. 12/713,133, dated Feb. 3, 2014, 2 pages.
"Supplementary European Search Report", EP Application No. 11747907.1, dated Nov. 7, 2012, 3 pages.
"Supplementary European Search Report", EP Application No. 11748027.7, dated Nov. 29, 2012, 3 pages.
"Supplementary European Search Report", EP Application No. 11748028.5, dated Nov. 7, 2012, 3 pages.
"Touch Screen is available in .36-50.8 mm thickness", ThomasNet Industrial News Room, Jul. 29, 2003, 2 pages.
"TouchSystems—Innovation Touch Screen Solution", Retrieved from <http://www.touchsystems.com/article.aspx?id=16> on Aug. 30, 2012, Aug. 14, 2012, 1 page.
"UI Guidelines Version 2.1", Retrieved from: http://na.blackberry.com/eng/deliverables/6622/BlackBerry_Smartphones-US.pdf., 76 Pages.
Appleinsider,"Special Report: Apple's Touch-Sensitive iPod Ambitions Disclosed in Filing", Retrieved from: <http://www.appleinsider.com/articles/06/10/26/special_report_apples_touch_sensitive_ipod_ambitions_disclosed_in_filing.html> on Nov. 11, 2009, Oct. 26, 2006, 10 pages.
Boudreaux,"Touch Patterns: Chapter 6—Programming the iPhone User Experience", retrieved from <http://oreilly.com/iphone/excerpts/iphone-programming-user/touch-patterns.html> on Oct. 25, 2011, 12 pages.
Brandl,"Combining and Measuring the Benefits of Bimanual Pen and Direct-Touch Interaction on Horizontal Interfaces", Retrieved from: <http://www.merl.com/papers/docs/TR2008-054.pdf> on Nov. 5, 2009, Mitsubishi Electric Research Laboratories, May 2008, 10 pages.
Daniels,"Brave New World", Retrieved from: <http://bookseller-association.blogspot.com/2009_03_01_archive.html> on Nov. 10, 2009, Mar. 2009, 54 pages.
Elliott,"First Dell, Then HP: What's Next for N-trig's Multitouch Screen Technology", Retrieved from: <http://news.cnet.com/8301-17938_105-10107886-1.html> on Nov. 11, 2009, Nov. 25, 2008, 5 pages.
Emigh,"Lenovo Launches Windows 7 ThinkPads with Multitouch and Outdoor Screens", Retrieved from: <http://www.betanews.com/article/Lenovo-launches-Windows-7-ThinkPads-with-multitouch-and-outdoor-screens/1253017166> on Nov. 11, 2009, Sep. 15, 2009, 3 pages.
Findlater,"Personalized Input: Improving Ten-Finger Touchscreen Typing through Automatic Adaptation", Proceedings of the SIGCHI Conference on Human Factors in Computing Systems, Available at <http://terpconnect.umd.edu/~leahkf/pubs/CHI2012-findlater-PersonalizedTyping.pdf>, May 5, 2012, 10 pages.
Fonseca,"New Apple Patent Hints at Touch Enabled Bezels for Future Devices", Retrieved from: <http://vr-zone.com/articles/new-apple-patent-hints-at-touch-enabled-bezels-for-future-devices/42928.html?utm_source=rss&utm_medium=rss&utm_campaign=new-apple-patent-hints-at-touch-enabled-bezels-for-future-devices> Jan. 31, 2014, Jul. 3, 2013, 6 Pages.
Goel,"GripSense: Using Built-In Sensors to Detect Hand Posture and Pressure on Commodity Mobile Phones", Proceedings of the 25th Annual ACM Symposium on User Interface Software and Technology, Oct. 7, 2012, pp. 545-554.
Gross,"Stretch-A-Sketch: A Dynamic Diagrammer", IEEE Symposium on Visual Languages, Available at <http://depts.washington.edu/dmachine/PAPER/VL94/vl.html>, Oct. 1994, 11 pages.
Hinckley,"Codex: A Dual Screen Tablet Computer", Conference on Human Factors in Computing Systems, Apr. 9, 2009, 10 pages.
Hinckley,"Sensor Synaesthesia: Touch in Motion, and Motion in Touch", CHI 2011, May 7-12, 2011, available at <http://research.

(56) References Cited

OTHER PUBLICATIONS microsoft.com/en-us/um/people/kenh/papers/touch-motion-camera-ready-final.pdf>, May 7, 2011, 10 pages.
Hinckley,"Stitching: Pen Gestures that Span Multiple Displays", CHI 2004, Available at <http://www.cs.cornell.edu/~francois/Papers/2004-Hinckley-AVI04-Stitching.>, 2004, pp. 1-8.
Hirche,"Adaptive Interface for Text Input on Large-Scale Interactive Surfaces", 3rd IEEE International Workshop on Horizontal Interactive Human Computer System, Oct. 1, 2008, pp. 153-156.
Hotelling,"Multi-functional hand-held device", U.S. Appl. No. 60/658,777, filed Mar. 4, 2015, 117 pages.
Hotelling,"Multi-functional hand-held device", U.S. Appl. No. 60/663,345, filed Mar. 16, 2005, 76 pages.
Kim,"Hand Grip Pattern Recognition for Mobile User Interfaces", Interaction Lab / Samsung Advanced Institute of Technology, Available at <http://www.alice.org/stage3/pubs/uistsensing.pdf>, 2006, pp. 1789-1794.
Krazit,"Has Apple Found the Magic Touch?", Retrieved from: <http://news.cnet.com/8301-13579_3-9879471-37.html> on Nov. 10, 2009, Feb. 26, 2008, 2 pages.
Lee,"The TypeWay iPad app is an adaptive on-screen keyboard", Retrieved from <http://www.ubergizmo.com/2012/02/the-typeway-ipad-app-is-an-adaptive-on-screen-keyboard/> on Mar. 7, 2013, Feb. 1, 2012, 2 pages.
Maxwell,"Writing drivers for common touch-screen interface hardware", Industrial Control Design Line, Jun. 15, 2005, 9 pages.
Minsky,"Manipulating Simulated Objects with Real-world Gestures using a Force and Position Sensitive Screen", Computer Graphics, vol. 18, No. 3, Available at <http://delivery.acm.org/10.1145/810000/808598/p195-minsky.pdf?key1=808598&key2=2244955521&coll=GUIDE&dl=GUIDE&CFID=57828830&CFTOKEN=43421964>, Jul. 1984, pp. 195-203.
Moore,"TypeWay Adaptive Keyboard for iPad Review", Retrieved from <http://www.technologytell.com/apple/89378/typeway-adaptive-keyboard-for-ipad-review/> on Mar. 6, 2013, Feb. 5, 2012, 10 pages.
Nordgren,"Development of a Touch Screen Interface for Scania Interactor", Master's Thesis in C—Available at <http://www.cs.umu.se/education/examina/Rapporter/PederNordgren.pdf>omputing Science, UMEA University, Apr. 10, 2007, pp. 1-59.
Olwal,"Rubbing and Tapping for Precise and Rapid Selection on Touch-Screen Displays", Conference on Human Factors in Computing Systems, Available at <http://www.csc.kth.se/~alx/projects/research/rubbing/olwal_rubbing_tapping_chi_2008.pdf>, Apr. 2008, 10 pages.
Panzarino,"Apple's iPad Mini Should have a Widescreen Display", Retrieved from <http://thenextweb.com/apple/2012/08/15/what-ipad-mini-169-instead-43/> on Aug. 29, 2012, Aug. 15, 2012, 6 pages.
Pierce,"Toolspaces and Glances: Storing, Accessing, and Retrieving Objects in 3D Desktop Applications", 1999 Symposium on Interactive 3D Graphics, Available at <http://delivery.acm.org/10.1145/310000/300545/p163-pierce.pdf?key1=300545&key2=8792497521&coll=GUIDE&dl=GUIDE&CFID=61004073&CFTOKEN=28819248>, Apr. 1999, pp. 163-168.
Roth,"Bezel Swipe: Conflict-Free Scrolling and Multiple Selection on Mobile Touch Screen Devices", CHI 2009, Available at <http://www.volkerroth.com/download/Roth2009a.pdf>, Apr. 2009, 4 pages.
Roth,"Bezel Swipe: Conflict-Free Scrolling and Multiple Selection on Mobile Touch Screen Devices", In 27th International Conference on Human Factors in Computing Systems, Retrieved from <http://www.volkerroth.com/download/Roth2009a.pdf>, Apr. 4, 2009, 4 pages.
Roudaut,"Leaf Menus: Linear Menus with Stroke Shortcuts for Small Handheld Devices", Proceedings of the 12th IFIP TC 13 International Conference on Human-Computer Interaction: Part I, Aug. 2009, 4 pages.
Saini,"Designing of a Virtual System with Fingerprint Security by considering many Security Threats", International Journal of Computer Applications, vol. 3—No. 2, available at <http://www.ijcaonline.org/volume3/number2/pxc387995.pdf>, Jun. 2010, pp. 25-31.
Sajid,"Microsoft Patent a Futuristic Virtual Multitouch Keyboard", Retrieved from <http://thetechnopath.com/microsoft-patent-futuristic-virtual-multitouch-keyboard/857/> on Mar. 6, 2013, Sep. 27, 2009, 8 pages.
Sax,"Liquid Keyboard: An Ergonomic, Adaptive QWERTY Keyboard for Touchscreens", Proceedings of Fifth International Conference on Digital Society, Feb. 23, 2011, pp. 117-122.
Serrano,"Bezel-Tap Gestures: Quick Activation of Commands from Sleep Mode on Tablets", n Proceedings of the SIGCHI Conference on Human Factors in IComputing Systems, Apr. 27, 2013, 10 pages.
T.,"Smartphone displays need a bezel. Here's why", Retrieved from: <http://www.phonearena.com/news/Smartphone-displays-need-a-bezel.-Heres-why_id27670> on Aug. 29, 2012, Mar. 12, 2012, 4 pages.
Vallerio,"Energy-Efficient Graphical User Interface Design", Retrieved from: <http://www.cc.gatech.edu/classes/AY2007/cs7470_fall/zhong-energy-efficient-user-interface.pdf>, Jun. 10, 2004, pp. 1-13.
Vigil,"Methods for Controlling a Floating Cursor on a Multi-touch Mobile Phone or Tablet in Conjunction with Selection Gestures and Content Gestures", U.S. Appl. No. 61/304,972, filed Feb. 16, 2010, 54 pages.
Yee,"Two-Handed Interaction on a Tablet Display", Retrieved from: <http://zesty.ca/tht/yee-tht-chi2004-short.pdf>, Conference on Human Factors in Computing Systems, Apr. 2004, 4 pages.
"Non-Final Office Action", U.S. Appl. No. 15/426,548, dated Jun. 30, 2017, 6 pages.
"Non-Final Office Action", U.S. Appl. No. 15/543,403, dated Jun. 30, 2017, 6 pages.
"Non-Final Office Action", U.S. Appl. No. 15/453,464, dated Jun. 30, 2017, 7 pages.
"Office Action Issued in European Patent Application No. 13798473.8", dated Apr. 6, 2018, 7 Pages.
"Non Final Office Action Issued in U.S. Appl. No. 15/958,783", dated May 24, 2018, 5 Pages.
Fourth Office Action Issued in Chinese Patent Application No. 201380059094.3, dated Sep. 5, 2018, 6 Pages.
"Non Final Office Action issued in U.S. Appl. No. 15/958,783", dated Dec. 26, 2018, 7 Pages.
"Final Office Action issued in U.S. Appl. No. 15/958,783", dated Apr. 30, 2019, 8 Pages.
Webpage Article: "Apple tweaks iOS to better detect accidental touches due to iPad mini's thinner bezel"; Author: Matthew Panzarino; Published: Oct. 24, 2012 (https://thenextweb.com/apple/2012/10/23/apple-tweaks-ios-to-better-detect-accidental-touches-due-to-ipad-minis-thinner-bezel/).
"Non Final Office Action Issued in U.S. Appl. No. 15/958,783", dated Aug. 15, 2019, 6 Pages.

\* cited by examiner

TOUCH-SENSITIVE BEZEL TECHNIQUES

RELATED APPLICATION

This application is a continuation of and claims priority to U.S. patent application Ser. No. 13/674,357 entitled "Touch-Sensitive Bezel Techniques" filed Nov. 12, 2012, the disclosure of which is incorporated by reference herein in its entirety.

BACKGROUND

Various mobile devices, such as tablet PCs, hand-held devices, and small multi-screen devices, include wide bezels to enable a user to hold the device without accidentally touching the combined display and touch screen. Even with the inclusion of a wide bezel, however, accidental touches can occur. When a user accidentally touches the screen, for instance, the device may perform undesired actions because it is unable to distinguish between an intentional touch by the user and an accidental touch by the user while the user is holding the device.

For example, when a user's thumb accidentally touches the display while the user is holding the device, the device can open or close an application or take another action in response to the touch. This can result in user frustration as undesired actions are performed because a small portion of the user's thumb has contacted the display. Consequently, these undesired actions may force device designer to sacrifice display size for a wider bezel.

SUMMARY

Touch-sensitive bezel techniques are described. Touch sensors are located in a bezel portion and a display portion of a display device of a computing device. The touch sensors detect a touch input and are used to determine, based on characteristics of the touch input, a likelihood that a user does not intend to interact with the computing device. Various factors can be used in determining the likelihood that the user does not intend to interact with the computing device. The location of a centroid of the touch input is one such factor.

In one or more implementations, a device includes touch sensors in a display portion of a display device and in a bezel portion of the display device. The touch sensors detect a touch input. One or more modules of the device determine a likelihood of whether the touch input is indicative of a user's intention to interact with a user interface displayed by the display device of the device or a user's intention to not interact with the user interface displayed by the display device of the device.

In one or more implementations, one or more touch sensors located in a bezel portion and a display portion of a display device detect a touch input while display capabilities of a region of the bezel portion are inactive. Responsive to detection of the touch input, the display capabilities of the region of the bezel portion are made active to cause a menu to be displayed in the region bezel.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Conventional mobile computing devices often perform undesired actions because they are unable to distinguish between an intentional touch by a user and an accidental touch by the user while the user is holding the device. For example, touch sensors in a display of the computing device typically detect touch inputs and perform an action based on the input. Accordingly, accidental touches of the display by the user can result in the device performing undesired actions. Thus, conventional devices typically include wide bezels, which can hinder mobility and design of the device.

Techniques described herein enable touch sensors located both in a bezel portion of a display device and in a display portion of a display device to detect a touch input, such as from a user's finger, and use this to determine whether the user intends to interact with the computing device. For example, when a user is holding the device and the user's thumb accidentally touches the display, a determination may be made that the user's thumb likely touched the display by accident. In such an instance, the computing device can ignore the input rather than perform an undesired action. Because the device can differentiate between an accidental touch and a touch intended to interact with the display, bezel width can be reduced in favor of a larger display area.

Additionally, techniques may be employed to display a menu in a region of the bezel. For instance, a menu or status bar can be displayed in a region of the bezel along the top of the display device. Consequently, the menu does not interfere with or overlap other objects being displayed on the display device or otherwise lessen the amount of usable space on the display device.

In the following discussion, an example environment is first described that may employ the techniques herein. Example procedures are then described which may be performed in the example environment as well as other environments. Thus, performance of the example procedures is not limited to the example environment and the example environment is not limited to the performance of the example procedures. Finally, an example device is described. The example device can be utilized to implement one or more embodiments.

Example Environment

Figure 1:
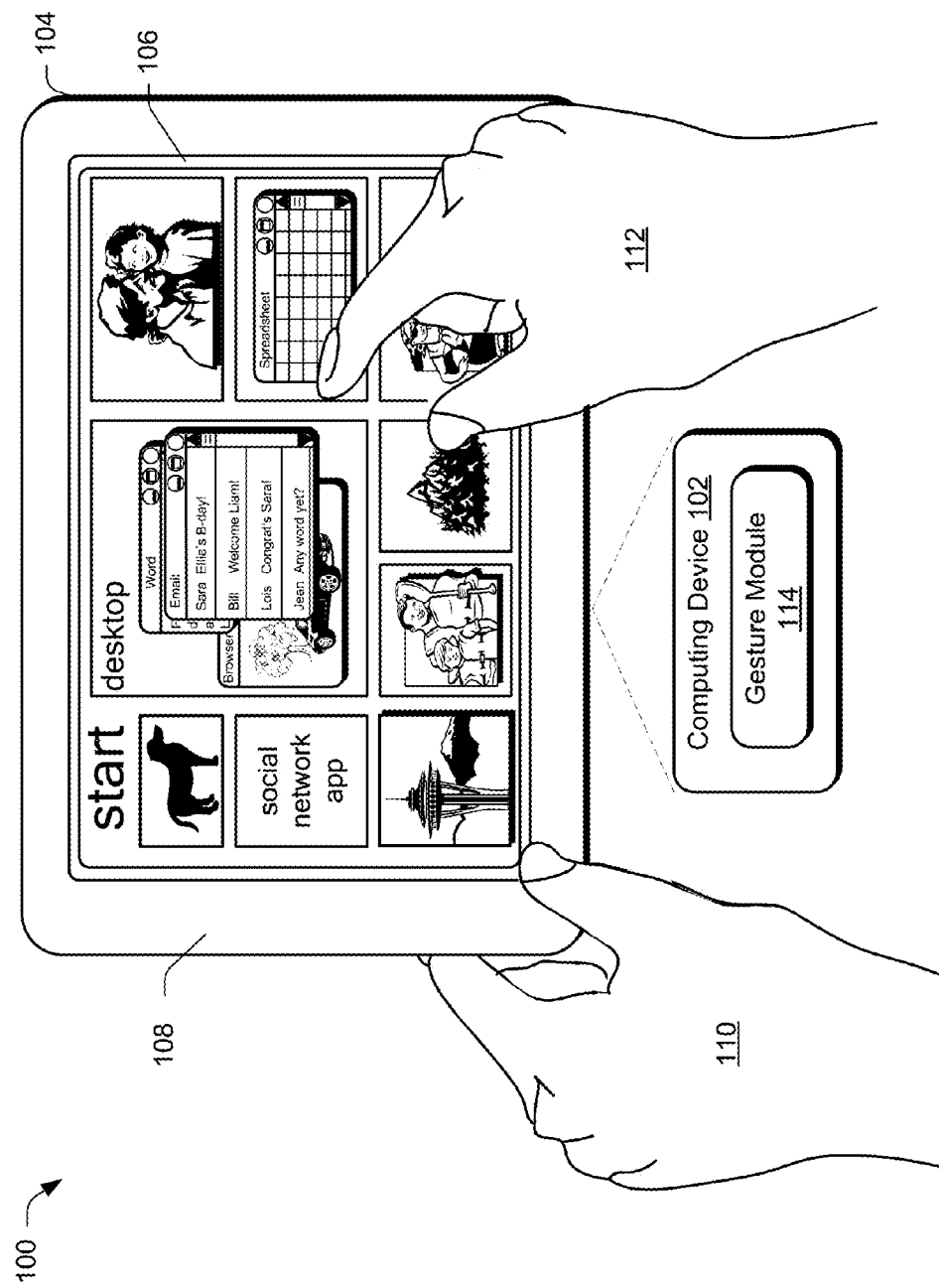
FIG. 1 is an illustration of an environment having a device including touch sensors in a bezel portion and a display portion of a display device to implement the techniques described herein.

FIG. 1 is an illustration of an environment 100 in an example implementation that is operable to employ techniques described herein. The illustrated environment 100 includes a computing device 102 that has a display device 104. The display device 104 includes a display portion 106 and a bezel portion 108. The computing device 102 may be configured in a variety of ways.

For example, a computing device may be configured as a desktop computer, a mobile station, an entertainment appliance, a set-top box communicatively coupled to a display device, a wireless phone, a game console, and so forth. Thus, the computing device 102 may range from a full resource device with substantial memory and processor resources (e.g., personal computers, game consoles) to a low-resource device with limited memory and/or processing resources (e.g., traditional set-top boxes, hand-held game consoles). Additionally, although a single computing device 102 is shown, the computing device 102 may be representative of a plurality of different devices, such as multiple servers, a remote control and set-top box combination, an image capture device and a game console configured to capture gestures, and so on.

During interaction with a device, a user may provide a variety of touch inputs, including some touch inputs that may be unintentional. For example, as shown in FIG. 1, the user may hold the computing device 102 between a thumb and index finger of a left hand 110 while interacting with the device using fingers of a right hand 112. While the user's thumb is located substantially in the bezel portion 108, the user may occasionally, and accidentally, touch display portion 106 with the thumb. Touch sensors in the display portion 106 can detect this touch input. Touch sensors in the display portion 106 also detect touch inputs that result from the user touching the screen with right hand 112. In some instances, gesture module 114 causes operations to be performed that correspond to a detected touch input.

In a conventional device, an operation may be performed when touch sensors in the display portion detect touch inputs from the user's left hand 110 and/or the user's right hand 112. Consequently, conventional devices may perform operations responsive to touch inputs regardless of the user's intention to interact with the device. However, by including touch sensors in the bezel portion 108, touch inputs to the bezel portion 108 can be detected and used by gesture module 114 to determine whether or not a user intended to interact with the computing device 102. For example, though the touches by both the left hand 110 and the right hand 112 are detected by touch sensors in the display portion 106, touch sensors located in the bezel portion 108 enable gesture module 114 to determine that the touch input by the left hand 110 is likely indicative that the user is holding the computing device 102.

Figure 2:
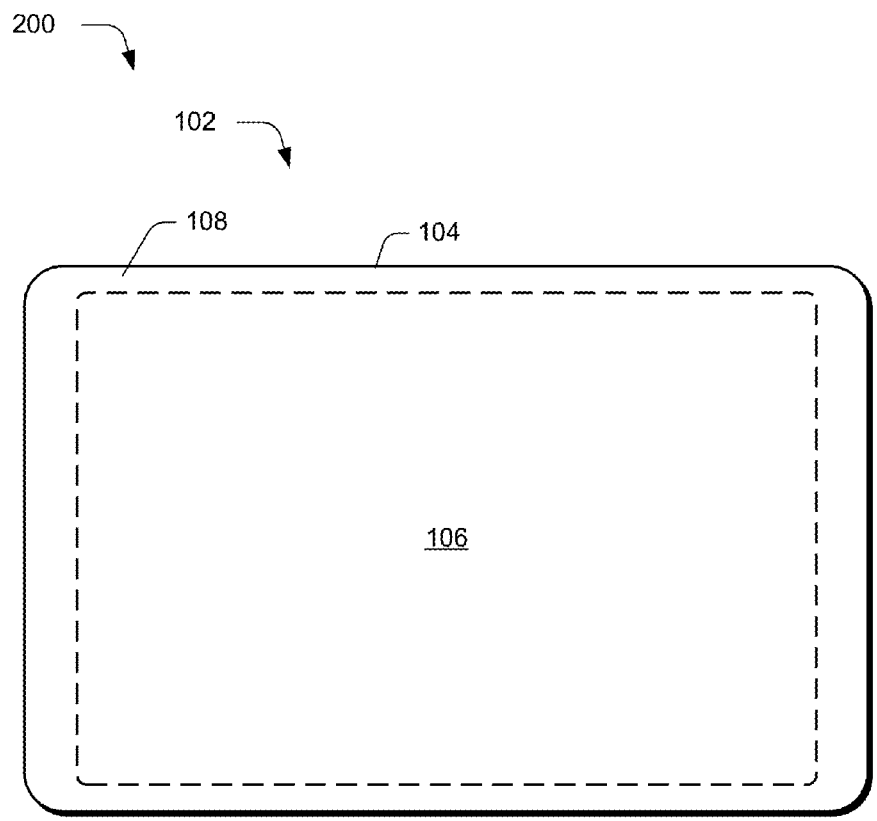
FIG. 2 is an illustration of a display device having a bezel portion and a display portion in accordance with one or more implementations.

FIG. 2 illustrates an example implementation 200 of the computing device 102 of FIG. 1. As shown in FIG. 2, the display device 104 includes a display portion 106 and a bezel portion 108 and touch sensors are located in both display portion 106 and bezel portion 108.

The touch sensors can take a variety of forms. For example, the touch sensor can be implemented as a digitizer or sensing elements associated with the display device 104 that can sense the user's input on the display portion 106 or the bezel portion 108. Technologies such as capacitive field technologies, resistive technologies, pressure sensing technologies, and other input sensing technologies can also be utilized to detect the touch input.

Touch sensors in the display portion 106 and in the bezel portion 108 can detect touch inputs to display device 104. In some implementations, touch sensors may be located in the display portion or in the bezel portion. In other implementations, touch sensors may extend from the display portion into the bezel portion. Either arrangement of touch sensors can enable the computing device 102 in FIG. 1 to differentiate between an accidental touch by left hand 110 and a touch by right hand 112 intended to interact with the device.

Figure 3:
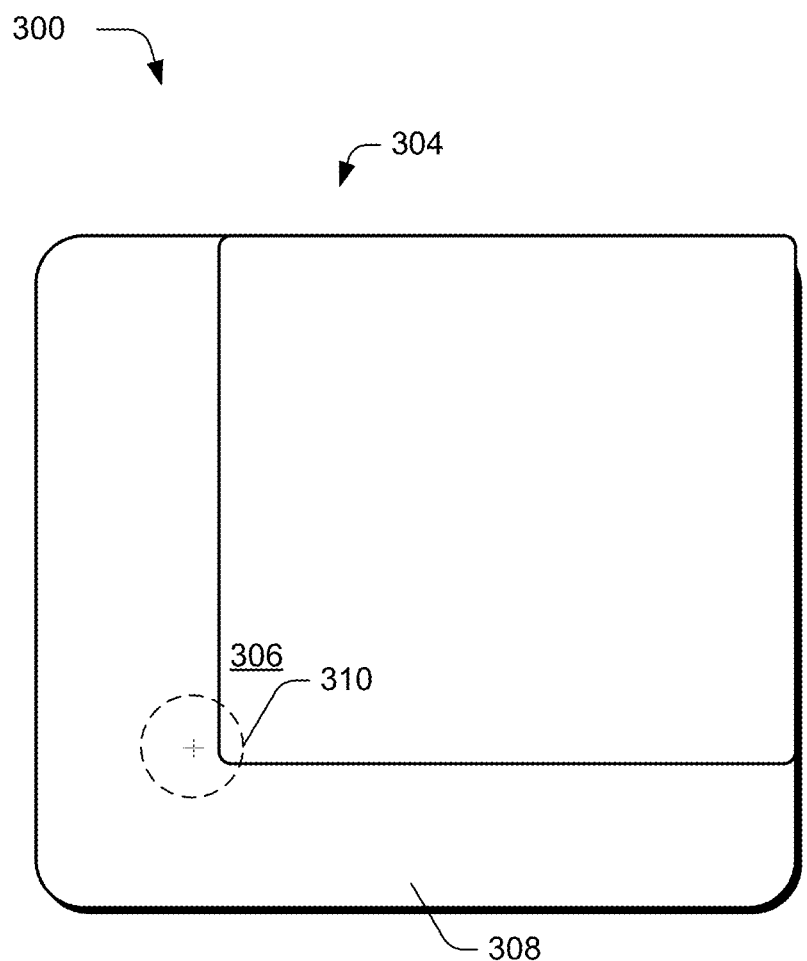
FIG. 3 is an illustration of an example centroid of a touch input in accordance with one or more implementations.
Figure 4:
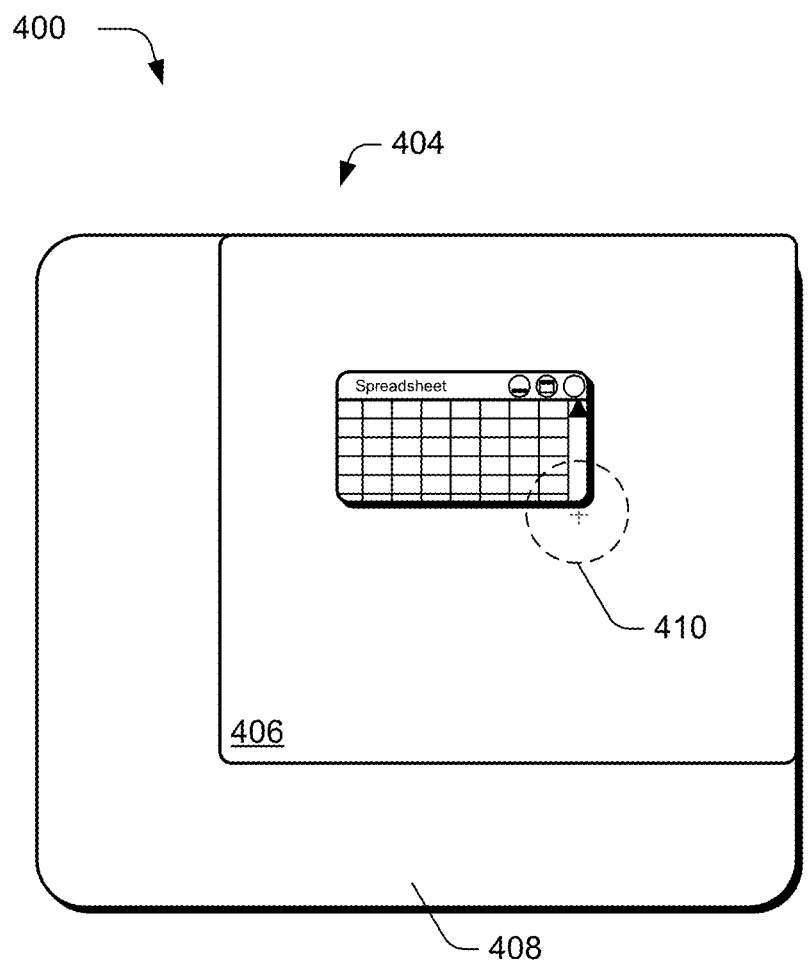
FIG. 4 is an illustration of an example centroid of another touch input in accordance with one or more embodiments.

Various factors can be used in determining a likelihood that the user does not intend to interact with the computing device. In some implementations, a determination that a user intends or does not intend to interact with the device is made according to a location of a centroid of the touch input. FIGS. 3 and 4 illustrate example implementations in which a centroid is used to determine a user's intention.

FIG. 3 illustrates a magnified view 300 of a display device 304 that includes touch sensors in a display portion 306 and a bezel portion 308. Assume that a user is holding the device in such a way that the thumb of the user's hand is mostly on the bezel portion 308, but is also partially on the display portion 306. For example, assume that the user is holding the device such as is illustrated by left hand 110 in FIG. 1. The area of this touch input is shown at 310.

The centroid (denoted "+") of the area of the touch input 310 is also shown in FIG. 3. A variety of suitable methods can be used to calculate the centroid. For example, any algorithm operating to determine the geometric center of the area of the touch input can be used. The centroid calculation can be a simple calculation or a weighted calculation that depends on the position and shape of the touch input. Based on the centroid, the device determines a likelihood that the user intends or does not intend to interact with the device. In various implementations, when the location of the centroid is within the bezel portion 308, as shown in FIG. 3, the device determines that the user is touching mostly the bezel portion 308. Consequently, the device may determine that the user does not intend to interact with the device. Thus, the device can ignore the touch input.

Now, assume that a user is using a single finger to make a selection on a user interface being displayed. FIG. 4 illustrates a magnified view 400 of a display device 404 in which a user intends to interact with the device. As above, the display device 404 includes touch sensors in a display portion 406 and in a bezel portion 408. However, in FIG. 4, the area of the touch input 410 does not extend into the bezel portion 408. Instead, the area of the touch input 410 is entirely within display portion 406 and the centroid (denoted "+") is within the display portion 406. Because the centroid of the area of the touch input 410 is located within the display portion 406, the device can determine that the user intended to interact with the device. The device may then perform an operation based on the touch input.

Although in FIGS. 1-4, the bezel portion was described as not including display capabilities, the techniques described may also be employed in implementations in which the bezel portion can act as an extension of the display portion. An example of such an implementation is described with reference to FIG. 5.

Figure 5:
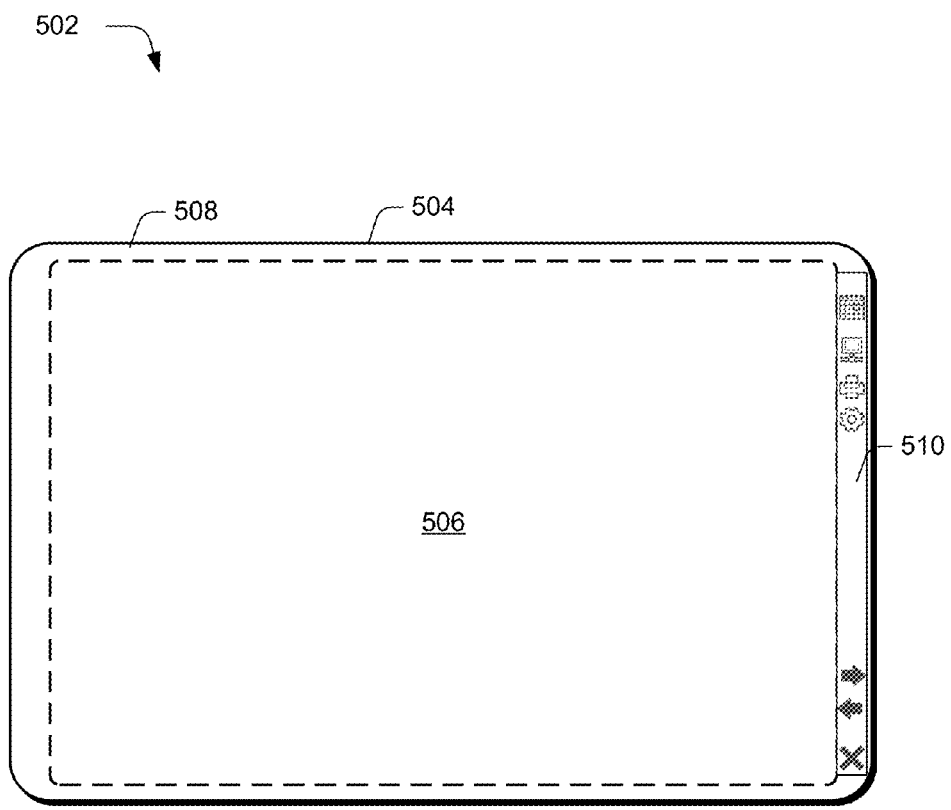
FIG. 5 illustrates an example implementation of a display device displaying a menu in a region of the bezel portion.

FIG. 5 illustrates an example computing device 502 having a display 504 that includes a display portion 506 and a bezel portion 508. The bezel portion 508 includes display capabilities. Though in some implementations the display capabilities of the bezel portion 508 are inactive, these capabilities can be made active in response to the detection of a touch input.

For example, touch sensors in the display portion 506 and the bezel portion 508 can detect touch inputs while the display capabilities of the bezel portion are inactive, such as described above in relation to FIGS. 1-4. However, when a touch input is detected within a region 510 of the bezel portion 508, rather than ignoring the touch input, the display capabilities of the region 510 can be made active. For example, a menu bar can be displayed in the region 510. Although reference is made to a menu bar, it should be noted that other types of user interfaces may be displayed in the region.

In some implementations, the computing device 502 can differentiate between a user intending to interact with the device and a user not intending to interact with the device based on an amount of time of the touch input. In such implementations, the duration of time of the touch input can be utilized to determine whether the touch input detected within the region 510 of the bezel portion 508 corresponds to a user intending to interact with the device or to a user not intending to interact with the device. For example, the computing device 502 can determine that a touch input to the region 510 that lasts longer than 0.25 seconds is likely indicative of a user holding the device whereas a touch input to the region 510 that lasts about 0.25 seconds or less is likely indicative of a user tapping within the region 510. It should be noted that although 0.25 seconds is used as an example threshold duration of the touch input, other durations are contemplated.

Once the display capabilities of the region 510 have been made active, a subsequent touch detected in the region 510 can be analyzed much the way a touch within the display portion is analyzed. In other words, if the centroid of the area of a touch input falls within the region 510, the device can determine that the user intended to interact with the region and can perform a corresponding operation. For example, if a centroid of the area of a touch input falls within the region 510 while a menu is displayed, the device can determine that the user intended to interact with the menu and can perform an associated function.

Example Procedures

Figure 6:
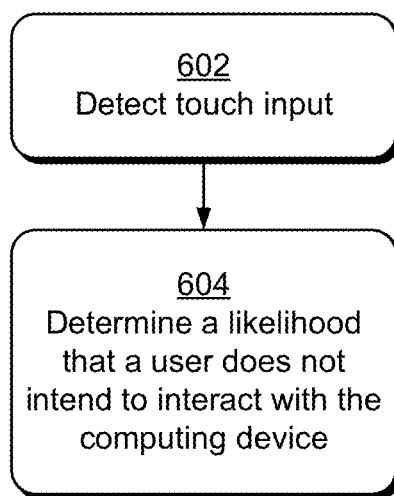
FIG. 6 is a flowchart illustrating an example procedure for determining a likelihood that a user does not intend to interact with a computing device in accordance with one or more embodiments.

FIG. 6 is a flowchart illustrating an example procedure 600 for implementing the techniques described in accordance with one or more embodiments. Procedure 600 can be carried out by a gesture module, such as gesture module 114 of FIG. 1. The procedure can be implemented in software, firmware, hardware, or combinations thereof. Procedure 600 is shown as a set of blocks and is not limited to the order shown for performing the operations of the various blocks.

Procedure 600 is an example procedure for implementing the techniques described herein; additional discussions of implementing the techniques described herein are included herein with reference to different figures.

Assume, as above, that a user holds computing device 102 with a left hand 110 and rests a thumb of the left hand on the display device 104. At least one touch sensor detects a touch input (block 602). The touch sensor can be associated with the display portion 106 or the bezel portion 108 of the display device 104 of FIG. 1, for example. As previously described, in some instances, such as when the user's thumb accidentally touches the display portion, a touch sensor located in the display portion 106 and a touch sensor located in the bezel portion 108 detect the touch input.

Figure 7:
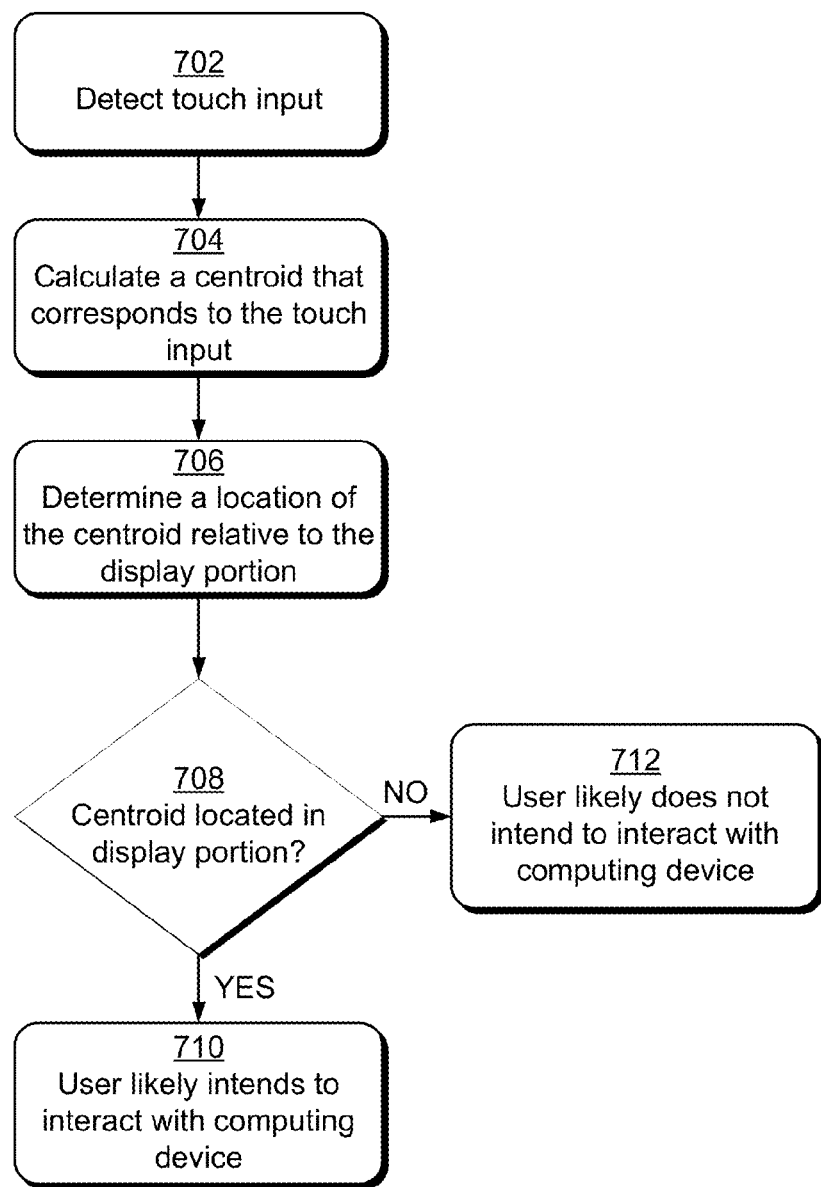
FIG. 7 is a flowchart illustrating another example procedure for determining a likelihood that a user intends or does not intend to interact with a computing device based on a location of a centroid of the touch input in accordance with one or more embodiments.

Based on the obtained touch information, the computing device 102 determines a likelihood that the user does not intend to interact with the computing device (block 604). For example, the gesture module 114 can determine that the user's thumb is located mostly in the bezel and that the user is likely holding the computing device. The gesture module 114 can make this determination based, for example, on the location of a centroid of the area of the touch input. FIG. 7 illustrates an example procedure for making this determination.

FIG. 7 is a flowchart illustrating another example procedure 700 for implementing the techniques described in accordance with one or more embodiments. As above, procedure 700 can be carried out by a gesture module, such as gesture module 114 of FIG. 1, and can be implemented in software, firmware, hardware, or combinations thereof. Procedure 700 is shown as a set of blocks and is not limited to the order shown for performing the operations of the various blocks.

In procedure 700, a touch sensor detects a touch input (block 702). The touch input can be, for example, a thumb of a user's left hand 110 when the user is holding computing device 102 or a finger of the user's right hand 112 when the user is interacting with a user interface.

The gesture module 114 calculates a centroid that corresponds to the touch input (block 704). Gesture module 114 can calculate the centroid based on a capacitor signal from a capacitive digitizer associated with the display device 104 or based on analogous signals received using other touch-sensing technologies. A variety of algorithms can be used to calculate the centroid.

The gesture module 114 then determines a location of the centroid relative to the display portion 106 (block 706). The gesture module 114 can map the centroid to its location on the display device 104. Such mapping to the display device can enable the gesture module 114 to determine if the centroid is located in an area corresponding to the display portion 106 or an area corresponding to the bezel portion 108. For example, gesture module 114 may determine that touch input from the thumb of the user's left hand 110 has a centroid located within the bezel portion 108 while the touch input from the finger of the user's right hand 112 has a centroid located within the display portion 106.

Next, the gesture module 114 performs a check to determine if the centroid is located in the display portion (block 708). If the centroid is located within an area corresponding to the display portion 106, the gesture module 114 determines that the user likely intends to interact with a user interface displayed by the display device 104 (block 710). If, however, the centroid is not located within an area corresponding to the display portion 106, gesture module 114 determines that the user likely does not intend to interact with the computing device 102 (block 712). For example, since the centroid of the touch input from the thumb of the user's left hand 110 is located within an area of the display device 104 that corresponds to the bezel portion 108, the gesture module 114 can determine that the touch input is likely indicative of the user holding the computing device. However, since the centroid of the touch input from the finger of the user's right hand 112 is located within an area of the display device 104 that corresponds to the display portion 106, the gesture module 114 can determine that the touch input is likely indicative that the user intends to interact with the user interface being displayed.

Figure 8:
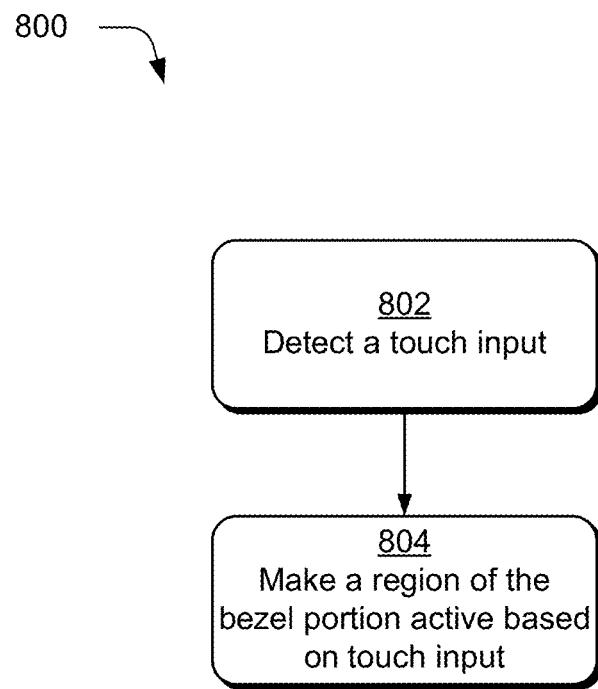
FIG. 8 is a flowchart illustrating another example procedure for implementing the techniques described herein in a device in which the bezel portion includes display capabilities in accordance with one or more embodiments.

In various implementations, the bezel portion includes display capabilities, such as is shown in FIG. 5. FIG. 8 illustrates an example procedure 800 for implementing the techniques in a device in which the bezel portion includes such display capabilities. Procedure 800 can be implemented in software, firmware, hardware, or combinations thereof. Procedure 800 is shown as a set of blocks and is not limited to the order shown for performing the operations of the various blocks.

As in the previously described procedures, touch sensors detect a touch input (block 802). The touch sensors may be located in the display portion 106 or the bezel portion 108 of the display device 104. In various implementations, the display capabilities of the bezel portion 108 are inactive when the touch input is detected.

Next, the computing device 102 makes display capabilities in a region of the bezel portion 108 active based on the touch input (block 804). Display capabilities in region 510 in FIG. 5, for example, can be made active effective to cause a menu to be displayed in the region. This may be performed responsive to a determination that a centroid of the touch input is located within an area corresponding to the bezel portion 108. In some implementations, the display capabilities of the region can be made active responsive to a determination that a centroid of the touch input is located within an area corresponding to the display portion or another area of the bezel portion. Subsequent touch inputs detected in the region while the display capabilities are active can be determined to be indicative of a user's intention to interact with the menu that is displayed in the region.

Although the use of a centroid was described in the above discussion, intention or lack thereof may be indicated by a variety of other characteristics, such as a size of the touch input, a shape of the touch input, a location of the touch input, a velocity of the touch input, a distance the touch input travels, or a lifetime of the touch input.

Having described various techniques and procedures, consider the following description of an example system and device that may be used to implement one or more techniques or procedures.

Example System and Device

Figure 9:
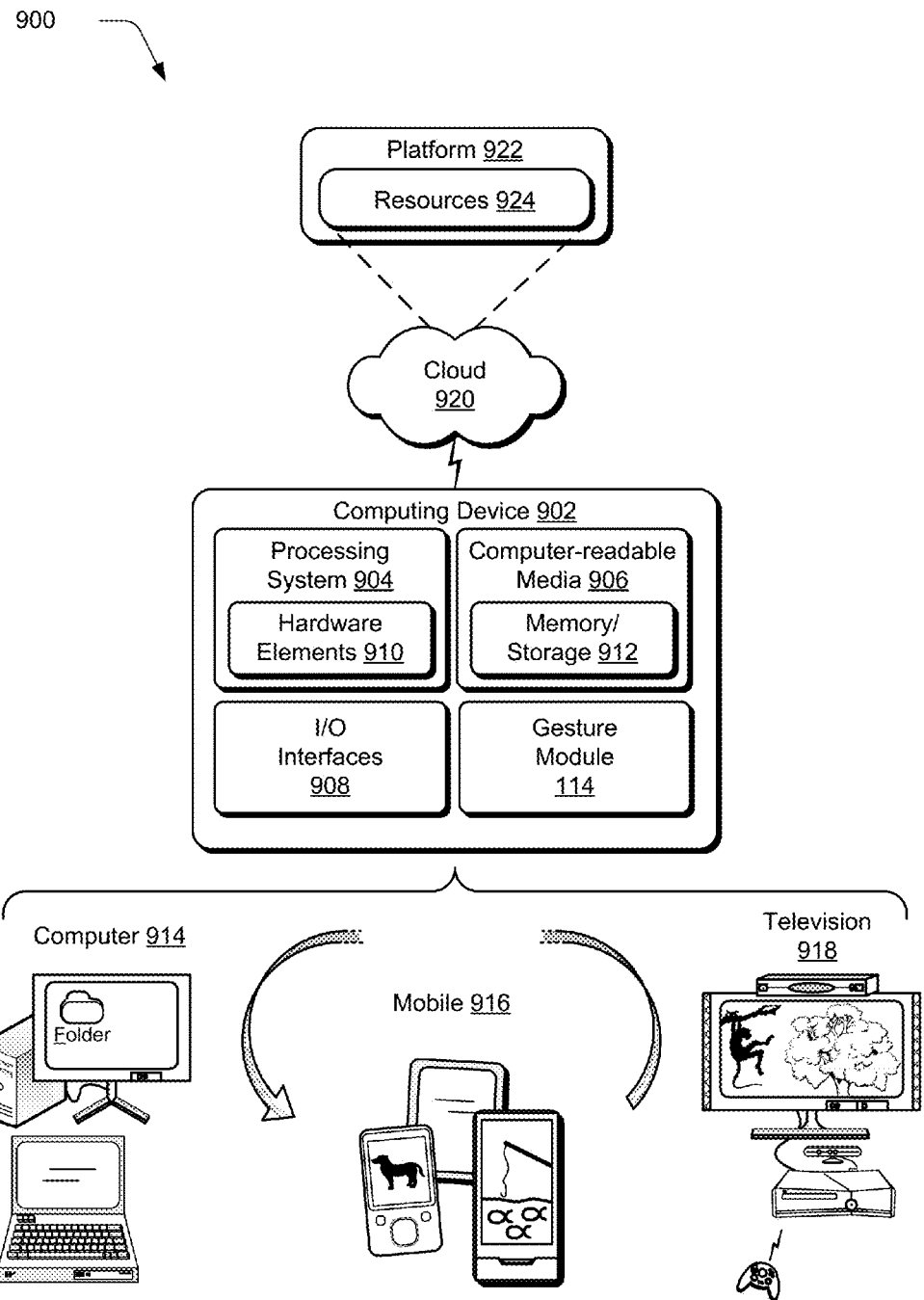
FIG. 9 illustrates an example system including various components of an example device that can be implemented as any type of computing device as described with reference to FIGS. 1-8 to implement embodiments of the techniques described herein.

FIG. 9 illustrates an example system generally at 900 that includes an example computing device 902 that is representative of one or more computing systems and/or devices that may implement the various techniques described herein. This is illustrated through inclusion of the gesture module 114, which as before may be executed on the computing device 902, as part of the platform 922 "over the cloud 920," and so on. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interface 908 that are communicatively coupled, one to another. The computing device 902 also includes a gesture module 114 that functions as described above. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, a display device including touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

As further illustrated in FIG. 9, the example system 900 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 900, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 902 may assume a variety of different configurations, such as for computer 914, mobile 916, and television 918 uses. Each of these configurations includes devices that may have generally different constructs and capabilities, and thus the computing device 902 may be configured according to one or more of the different device classes. For instance, the computing device 902 may be implemented as the computer 914 class of a device that includes a personal computer, desktop computer, a multi-screen computer, laptop computer, netbook, and so on.

The computing device 902 may also be implemented as the mobile 916 class of device that includes mobile devices, such as a mobile phone, portable music player, portable gaming device, a tablet computer, a multi-screen computer, and so on. The computing device 902 may also be implemented as the television 918 class of device that includes devices having or connected to generally larger screens in casual viewing environments. These devices include televisions, set-top boxes, gaming consoles, and so on.

The techniques described herein may be supported by these various configurations of the computing device 902 and are not limited to the specific examples of the techniques described herein. This functionality may also be implemented all or in part through use of a distributed system, such as over a "cloud" 920 via a platform 922 as described below.

The cloud 920 includes and/or is representative of a platform 922 for resources 924. The platform 922 abstracts underlying functionality of hardware (e.g., servers) and software resources of the cloud 920. The resources 924 may include applications and/or data that can be utilized while computer processing is executed on servers that are remote from the computing device 902. Resources 924 can also include services provided over the Internet and/or through a subscriber network, such as a cellular or Wi-Fi network.

The platform 922 may abstract resources and functions to connect the computing device 902 with other computing devices. The platform 922 may also serve to abstract scaling of resources to provide a corresponding level of scale to encountered demand for the resources 924 that are implemented via the platform 922. Accordingly, in an interconnected device embodiment, implementation of functionality described herein may be distributed throughout the system 900. For example, the functionality may be implemented in part on the computing device 902 as well as via the platform 922 that abstracts the functionality of the cloud 920.

CONCLUSION

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

The invention claimed is:

1. A device comprising:
one or more touch sensors included in a display portion of a display device and in a display capable bezel portion of the display device, the one or more touch sensors configured to detect a touch input; and
one or more circuits configured to determine, based on a centroid of the touch input being detected within the display capable bezel portion, if a user intends the touch input to cause a display to occur in the display capable bezel portion and does not intend to interact with the display portion of the display device as a result of the touch input.

2. The device as recited in claim 1, wherein the one or more circuits are further configured to determine the user intention based at least in part on an additional touch input detected by the one or more touch sensors in either the display portion or the display capable bezel portion of the display device.

3. The device as recited in claim 1, wherein the one or more circuits are further configured to determine the user intention based at least in part on a duration of the touch input.

4. The device as recited in claim 1, wherein the display capable bezel portion is configured to activate a bezel display responsive to the determination to cause the display to occur in the display capable bezel portion.

5. The device as recited in claim 4, wherein the bezel display comprises a menu bar.

6. The device as recited in claim 4, wherein the one or more touch sensors are further configured to detect a subsequent touch input as an interaction with the bezel display.

7. The device as recited in claim 1, wherein the centroid of the touch input is calculated based on a position and a shape of the touch input.

8. A method comprising:
detecting a touch input using one or more touch sensors that are located in a display capable bezel portion and in a display portion of a display device integrated in a mobile computing device; and
determining, based on a centroid of the touch input being detected within the display capable bezel portion, if a user intends the touch input to cause a display to occur in the display capable bezel portion and does not intend to interact with the display portion of the display device as a result of the touch input.

9. The method as recited in claim 8, wherein said determining the user intention is further based on an additional touch input detected by the one or more touch sensors in either the display portion or the display capable bezel portion of the display device.

10. The method as recited in claim 9, further comprising ignoring the touch input as unintentional, and initiating a display action based on the additional touch input.

11. The method as recited in claim 8, further comprising determining that the touch input is unintentional, in that the user does not intend to cause the display to occur in either of the display capable bezel portion or in the display portion of the display device.

12. The method as recited in claim 8, further comprising activating a bezel display responsive to said determining the user intention to cause the display to occur in the display capable bezel portion.

13. The method as recited in claim 8, further comprising calculating the centroid of the touch input based on a position and a shape of the touch input.

14. The method as recited in claim 8, wherein said determining the user intention is further based on a duration of the touch input.

15. A method comprising:
detecting a touch input using one or more touch sensors that are located in a bezel portion and in a display portion of a display device integrated in a mobile computing device;
determining a centorid of the detected touch input based on a position and a shape of the touch input; and
activating display capabilities of a region of the bezel portion responsive to the detected touch input being located within an area corresponding to the bezel portion of the display device.

16. The method as recited in claim 15, further comprising displaying a menu in the bezel portion of the display device responsive to said activating the display capabilities of the region of the bezel portion.

17. The method as recited in claim 15, wherein said activating the display capabilities of the region of the bezel portion comprises the bezel portion acting as an extension of the display portion of the display device.

18. The method as recited in claim 15, further comprising detecting a subsequent touch input in the bezel portion of the display device, and initiating a display action responsive to the subsequent touch input.

19. The method as recited in claim 15, wherein said activating the display capabilities of the region of the bezel portion based on a duration of the detected touch input.

* * * * *